(12) United States Patent
Cirne

(10) Patent No.: US 7,712,109 B2
(45) Date of Patent: May 4, 2010

(54) DIALOG ITEM INTERFACE DEFINITION OBJECT

(75) Inventor: Lewis K. Cirne, Sunnyvale, CA (US)

(73) Assignee: Apple Inc., Cupertino, CA (US)

( * ) Notice: Subject to any disclaimer, the term of this patent is extended or adjusted under 35 U.S.C. 154(b) by 1261 days.

(21) Appl. No.: 10/445,365

(22) Filed: May 21, 2003

(65) Prior Publication Data

US 2004/0006649 A1   Jan. 8, 2004

Related U.S. Application Data

(63) Continuation of application No. 08/243,590, filed on May 16, 1994, now abandoned.

(51) Int. Cl.
G06F 3/00 (2006.01)
G06F 9/44 (2006.01)
G06F 9/46 (2006.01)
G06F 13/00 (2006.01)

(52) U.S. Cl. ..................................... 719/328
(58) Field of Classification Search .................. 719/310, 719/328; 715/705, 788, 798, 799, 800, 804, 715/808, 825, 826, 744, 809
See application file for complete search history.

(56) References Cited

U.S. PATENT DOCUMENTS

| | | | | |
|---|---|---|---|---|
| 5,075,847 A | * | 12/1991 | Fromme | 717/136 |
| 5,119,475 A | * | 6/1992 | Smith et al. | 715/866 |
| 5,140,677 A | * | 8/1992 | Fleming et al. | 715/835 |
| 5,151,987 A | * | 9/1992 | Abraham et al. | 714/20 |
| 5,339,392 A | * | 8/1994 | Risberg et al. | 715/762 |
| 5,345,550 A | * | 9/1994 | Bloomfield | 715/841 |
| 5,404,441 A | * | 4/1995 | Satoyama | 715/762 |
| 5,414,812 A | | 5/1995 | Filip et al. | |
| 5,436,637 A | * | 7/1995 | Gayraud et al. | 715/705 |
| 5,438,659 A | * | 8/1995 | Notess et al. | 715/505 |
| 5,485,617 A | * | 1/1996 | Stutz et al. | 719/315 |
| 5,515,536 A | * | 5/1996 | Corbett et al. | 719/315 |
| 5,546,525 A | * | 8/1996 | Wolf et al. | 715/809 |
| 5,555,370 A | * | 9/1996 | Li et al. | 715/763 |

(Continued)

FOREIGN PATENT DOCUMENTS

EP     0 304 072     2/1989

OTHER PUBLICATIONS

Linton, M.A.; Vlissides, J.M.; Calder, P.R., "Composing user interfaces with InterViews", Feb. 1989, IEEE, Computer vol. 22, Iss. 2, pp. 8-22.*

(Continued)

*Primary Examiner*—Hyung S Sough
*Assistant Examiner*—KimbleAnn Verdi
(74) *Attorney, Agent, or Firm*—Buchanan Ingersoll & Rooney

(57) ABSTRACT

An object-oriented item is used to define the behavior of an item in a dialog box in a windows environment. A class hierarchical library is established with a base class setting up initial definitions of instance variables and methods used to define the behavior of a customized item. An applications developer can create customized items for a dialog box by creating subclasses. The subclasses will inherit portions of the superclasses, and the developer will customize the items by overriding certain methods. The object, an instance of the class, is referenced by a resource associated with an application.

16 Claims, 15 Drawing Sheets

U.S. PATENT DOCUMENTS

| | | | | | |
|---|---|---|---|---|---|
| 5,608,898 | A | * | 3/1997 | Turpin et al. | 707/201 |
| 5,623,591 | A | * | 4/1997 | Cseri | 715/762 |
| 5,699,310 | A | * | 12/1997 | Garloff et al. | 717/108 |
| 5,710,926 | A | * | 1/1998 | Maurer | 717/108 |
| 5,717,877 | A | * | 2/1998 | Orton et al. | 715/860 |
| 6,327,627 | B1 | * | 12/2001 | Orton et al. | 719/328 |
| 6,354,748 | B1 | * | 3/2002 | Vrvilo | 709/204 |

OTHER PUBLICATIONS

Norton, P.; Yao, P., "Borland C++ Programming for Windows", 1992, Bantam Books, Version 3.0, pp. 57, 64, 77, 84, 377, 383-385, and 390-392.*

Norton, P.; Yao, P., "Borland C++ Programming for Windows", 1992, Bantam Books, Version 3.0, pp. 1-17, 45-57, 64, 77-112, 377, 383-385, and 390-392.*

Borland International, "Turbo C++, Getting Started",1990, Borland International, pp. 121-122, 131, 139, 141, 145-149.*

Borland International, "Turbo C++, Programmer's Guide",1991, Borland International, Second Edition, pp. Chapter 3.*

Microsoft Windows 3.1, Programmer's Reference, vol. 1, Overview, Microsoft Press 1987-1992, Chapter 1.7, "Dialog Boxes", pp. 48-58; Chapter 4, "Common Dialog Box Library", pp. 129-162.

Inside Macintosh, Overview, by Apple Computer, Inc., Addison-Wesley Publishing Company, 1992.

Inside Macintosh, Macintosh Toolbox Essentials, by Apple Computer, Inc., Addison-Wesley Publishing Company, 1992.

"Turbo Vision Version 2.0", Borland International, Inc., 1992 (pp. 53-60, 94-107, 113-148, 195-196, 204-209, 209-314, 286-390, 415-418, 445-454, 460-464, 560-581).

Employees of Borland Int., *Turbo C++ Programmers' Guide*, Borland Int., 1990.

OS/2 2.1 Application Programmer's Guide, by Jody Kelly, Craig Swearingen, Dawn Bezviner and Theodore Shrader, Van Nostrand Reinhold (New York 1994), Chapter 18, "System Object Model (SOM)", pp. 497-562.

Microsoft Windows 3.1, Guide to Programming, Microsoft Press, 1987-1992, Chapter 9, "Dialog Boxes", pp. 191-195.

ResEdit Reference for ResEdit, version 2.1, by Apple Computer, Inc., Addison-Wesley Publishing Company, 1991. [Table of Contents only].

Objects for OS/2, by Scott Danforth, Paul Koenen and Bruce Tate (1994) [Table of Contents only].

OS/2® 2.1 Application Programmer's Guide, by Jody Kelly, Craig Swearingen, Dawn Bezviner, Theodore Shrader. [Table of Contents only].

Think, C., Symantec C++, The Professional's Choice, User's Guide, Symantec Corporation 1993, Chapter 23, "Object-Oriented Programming", pp. 419-426.

OS/2 2.0 Technical Library: Presentation Manager Programming Reference vol. III, by IBM (Mar. 1992).

Understanding the Macintosh Resource Editor, *Byte* by Laurence H. Loeb (Jul. 1989).

* cited by examiner

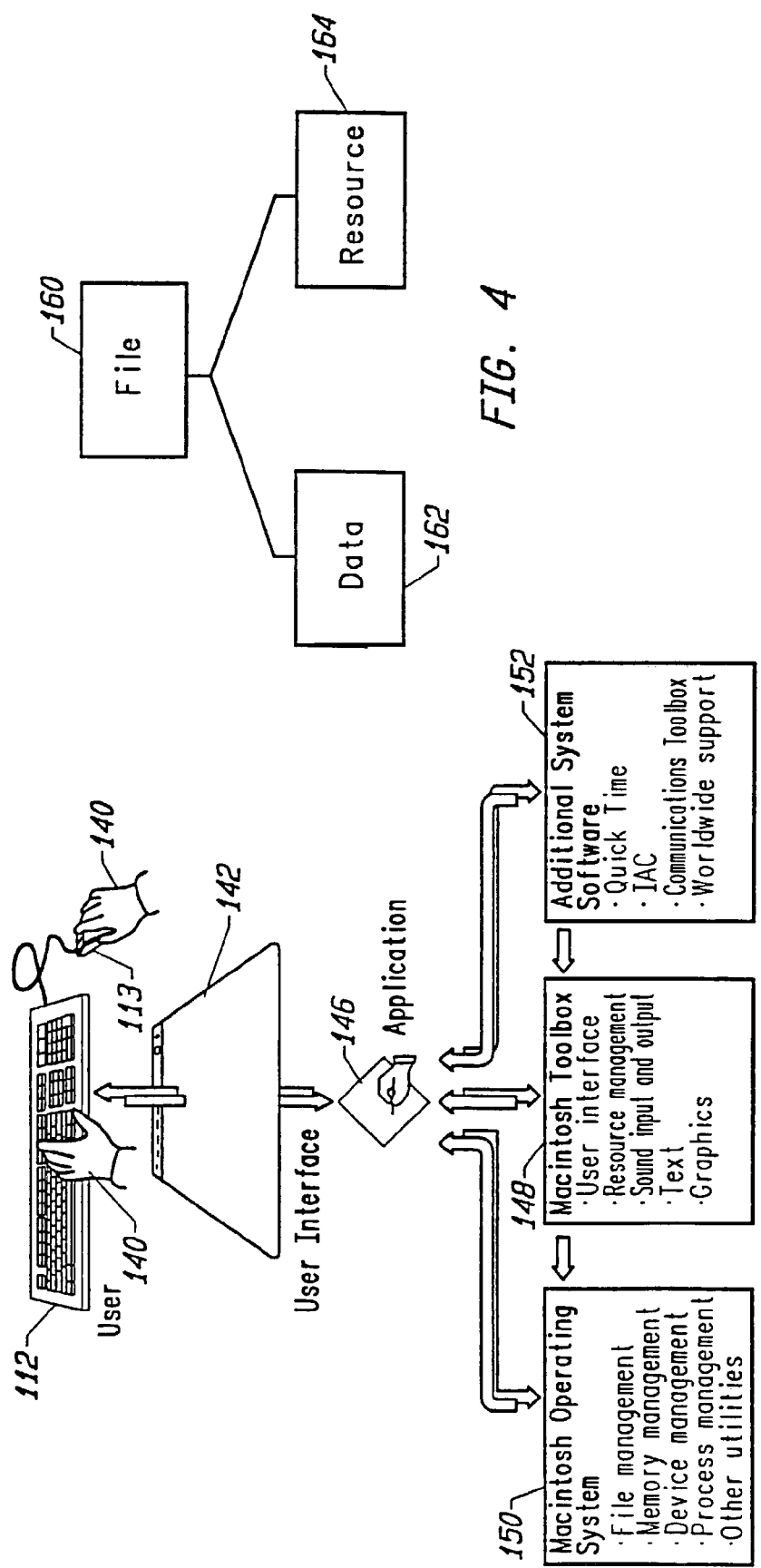

DIALOG ITEM INTERFACE DEFINITION OBJECT

This application is a continuation of application Ser. No. 08/243,590, filed on May 16, 1994 now abandoned.

LIMITED COPYRIGHT WAIVER

A portion of the disclosure of this patent document contains material which is subject to copyright protection. The copyright owner has no objection to the facsimile reproduction by anyone of the patent document or the patent disclosure as it appears in the U.S. Patent and Trademark Office patent file or records, but otherwise reserves all copyright rights whatsoever.

BACKGROUND OF THE INVENTION

1. Field of the Invention

The present invention is directed to a system for defining, using and customizing items in a dialog box.

2. Description of the Related Art

Many computers utilize a windows environment. A window is a user interface element that delimits an area on the screen in which a user can enter and view information. Software applications that have a user interface, can use windows to communicate with the user. A software application (or simply "application") is computer software that performs a particular task. Any piece of information that an application needs to present to a user can be displayed in a window. Similarly, any piece of information that an application needs to solicit from a user can be obtained by requesting the user to perform appropriate actions in a window. Appropriate actions means that the user types in information, edits information, checks a box or uses a mouse to click on a button or icon.

There can be at least two general kinds of windows: document windows and dialog boxes. Document windows are used primarily to allow the user to enter and manipulate information, such as text, graphics or other data. Often, but not always, the information in a document window can be stored in a file, from which the user can later retrieve the information.

The dialog box is a window that is used for some special, limited purpose. In the simplest case, a dialog box can be used to display information to the user. The information might be a report of an error, a greeting, or a progress bar showing what percentage of some operation has been completed. A dialog box is usually a pop-out window that an application uses to display or prompt for information. In some cases, the information is needed to complete a command. Dialog boxes can display information to the user, allow the user to change information and allow the user to enter additional information. A dialog box can contain one or more items, with which the user can type text, choose options, or direct the action of a particular command. The items include, but are not limited to, a button, a check box, editable text, a help item, icon, a picture, radio button, and static text. The above listed items are predefined items. An applications developer also can create user-defined or customized items.

FIG. 1 shows dialog box 10, which may be used as part of an application to draw Venn Diagrams. Dialog box 10 includes various items. For example, dialog box 10 includes a button 12 ("Save current preferences"). If the user clicks on button 12, the application will save all the selections the user made in the dialog box. The term "click" is defined to include the act of the user, using a mouse, placing the cursor over the button and depressing a button on the mouse. The mouse can be replaced by another apparatus for positioning the cursor. Dialog box 10 also includes four check boxes 14, 16, 18, 20, all of which have associated static text. For example, check box 14 has static text "Give existential import to subjects." In an alternative embodiment, each of the static text can be thought of as separate items. While the dialog box is active on a screen, the user can click on the check box. Clicking on the associated check box (14, 16, 18 and 20), toggles the check box between chosen and unchosen states. When the user clicks on button 12, the features that are chosen from check boxes 14, 16, 18 and 20 are stored and used by the application in producing the Venn Diagram.

Dialog box 10 also includes eight radio buttons 30, 32, 34, 36, 38, 40, 42 and 44. Each radio button has an associated picture 46, 48, 50, 52, 54, 56, 58, and 60, respectively. Each of these pictures shows an available feature; for example, picture 46, 48, 50 and 52, show the existence of symbols, and pictures 54, 56, 58 and 60 show emptiness patterns that can be used in the Venn Diagram. The user can click on various radio buttons to select or deselect any of the symbols or emptiness patterns. When the user clicks Save Button 12, the selected patterns and symbols are stored. Alternatively, pictures 46, 48, 50, 52, 54, 56, 58 and 60 can be separate icons.

Dialog boxes tend to be easier to create and manage as compared to document windows. Many computers will have a Dialog Manager that manages or oversees the use of dialog boxes. The Dialog Manager reads a description of the dialog box and the items inside the dialog box. The Dialog Manager then draws the dialog box and process (or manage the response to) user actions that effect the dialog box. The Dialog Manager's duties include manipulating items in a dialog box, including but not limited to, drawing an item, erasing an item, changing the appearance of an item and overseeing the handling of any event which effects the item.

Currently, the behavior of a dialog box and its items are defined in the Dialog Manager, the windows system, or in an application. The phrase "defining behavior" includes, but is not limited to, defining how and where to draw dialog boxes and dialog items, various attributes of the items (e.g. font, point size, color, test, etc.) and what actions need to be performed when an event occurs (for example when a user clicks on an item, enters text in an item, edits text in an item or performs any other action involving an item or dialog box). When designing a Dialog Manager and accompanying software, the Dialog Manager includes predefined items for an applications programmer to use in dialog boxes. Thus, a windows environment may come with a library of predefined items.

The current use and structure of dialog boxes and dialog items has given rise to some hardship in regard to software development. A first hardship occurs when the provider of the Dialog Manager or windows system, and perhaps the operating system, desires to make changes to the library of predefined items. Changes to the library include adding more items or changing the definition of preexisting items. Making changes to the library usually requires making changes to the Dialog Manager, and possibly the windows system or the operating system (the Dialog Manager may or may not be part of the operating system). Additionally, after completing the changes to the library, the operating system and the Dialog Manager may need to be recompiled in order to take advantage of new features. In most cases, if the operating system, window system or Dialog Manager are recompiled, applications that run on the operating system or windows system must be recompiled in order to take advantage of the new features. Thus, as the provider of a window system or Dialog Manager adds new items or changes items in the library, every application running on the system may need to be recompiled. This is burdensome on the users and applications developers.

Furthermore, changes in the library may make other library items or software applications obsolete. Specifically, if the definition of an item is changed other items which incorporate that item or applications which incorporate that item will no longer function properly and may need to be edited.

A third hardship arises when an application developer (developer) needs to use an item that does not appear in the predefined item library. Thus, the applications programmer creates a new, customized item. Currently, creating a customized item requires a lot of effort. The applications programmer must understand how the Dialog Manager works and how to override various features of the Dialog Manager to deal with a new type of item. Also contributing to the hardship is the possibility that the applications developer does not have the ability to easily incorporate all the prior definitions and code used to define the original library.

Another problem is that each item's behavioral definition may include instructions for behaving in various situations. When the Dialog Manager accesses an item's behavioral definition, there is only one point of entry for the Dialog Manager. Currently, behavioral definitions are typically defined by a list of instructions. When the Dialog Manager accesses the item, the Dialog Manager reads the first instruction on the list of instructions followed by reading the second instruction and so on, until the Dialog Manager completes all the necessary steps as defined in the list of instructions. However, the Dialog Manager may only need to execute a small subset of instructions to carry out the desired task. Thus, it is a waste of processing time for the Dialog Manager to execute instructions not pertinent to the desired task. Additionally, having only one entry point requires a developer to create code to handle the flow of control from that one entry point to all sets of behavioral definitions. Thus, the developer may be required to create a large amount of code for simple customizations.

When an applications developer creates a customized item, the module defining the new item can be a separate file from or part of the application program. The application may need to be compiled every time the definition of the item is altered. Additionally, when the applications developer is creating a second application, the item defined in the first application would not necessarily be able to be referenced by, for example, a pointer in the second application because part of the code used to create the new dialog item is in the first application. Finally, because the applications developer is overriding various segments of code in the Dialog Manager, a change in the Dialog Manager could render an application (with a custom or user-defined item) obsolete.

SUMMARY OF THE INVENTION

The present invention is directed to overcome the disadvantages of the prior art. Thus, the present invention is directed to a dialog item interface definition object which allows for the creation of customized dialog items in a simple and more powerful manner. The advantages of the dialog item interface definition object (hereinafter referred to as a "IDO") includes the property of longevity. That is, a change in the dialog item library generally does not render an IDO obsolete. Furthermore, an IDO is independent. That is, an IDO is not part of the operating system, the windows system, Dialog Manager or the application. Thus, the IDO can be edited without necessarily having to recompile the application, windows system, Dialog Manager or operating system. Similarly, a change in the item library, or Dialog Manager or application or windows system, would not necessarily require recompiling the IDO.

Creation of a custom item using an IDO requires significantly less code to be written and less understanding of the Dialog Manager. An item designed with an IDO can include multiple entry points; therefore, reducing the time wasted executing commands that are not pertinent to the behavior sought to be implemented. Additionally, because there are multiple entry points, a developer creating an IDO need only create code for the entry points that are being customized.

Finally, dialog items created using an IDO can be edited without affecting other software and can include a system for self editing. Most editing tools are packaged with a window system or are sold as an off the shelf item. These tools would not necessarily know how to edit a custom dialog item. The self editing capability of an IDO allows for the editing of a custom dialog item.

An IDO is implemented using an object oriented class library (or class structure or class hierarchy). Each class can define the behaviors and attributes used in a particular item. A class library can be created separately from the operating system, windows system, Dialog Manager and application. The applications developer adds to the class library to customize a dialog item. When an application is written, the application need only include a reference to a dialog window. A resource is then created which defines the dialog window. This resource has references to the various items needed in the window. The references could indicate a class in the class library. Because the object oriented class library is used, defining or customizing a new item allows for inheriting all the features of a superclass and overriding only the pertinent features needed for customizing.

Accordingly, one aspect of the present invention includes a class structure including a base class and a subclass. The base class has a method adapted to be inherited by the subclass. The method is capable of defining a behavior of an item. A resource, associated with the application, is included which is adapted to store a reference to a particular subclass. The system includes a manager. The manager is adapted to be in communication with the resource, such that the manager can find the referenced subclass. The manager is adapted to manipulate an item in a dialog box according to the behavior defined in the referenced subclass (or class). The base class can have a plurality of methods. There can be more than one subclass and each subclass can inherit all or some of the methods defined in the base class. Each subclass can have its own subclass which can inherit methods. A subclass can be compiled without compiling the base class (and vice versa). Additionally, a subclass can be compiled without compiling the application, or the windows system, the manager or the operating system (and vice versa).

Another aspect of the present invention includes a dialog interface definition object for defining an item in a dialog box. The dialog box is used as part of an application. The application includes a resource adapted to store and reference information relative to the dialog box. The information is used by a manager to manipulate the dialog box and the dialog items. An object is an instance of a class in a class library. The class includes attributes, inherited methods capable of defining a first behavior of the item, and new methods which override a methods defined in a superclass and are capable of defining a second behavior of the item. The new methods are capable of being inherited by subclasses.

Another aspect of the invention includes a method for creating an item in a dialog box. The method includes the steps of executing an instruction calling for the dialog box and reading a resource associated with the dialog box. The step of reading a resource includes the steps of reading a list of items to be presented in the dialog box and following a reference, in the list of items, which references an object. The method further includes waiting for a first event and executing a first method associated with the first event, without executing other methods in response to the first event. The event can be a draw event, and thus a draw method is executed.

A further aspect of the present invention includes a method for defining the behavior of a new item to be used in the dialog. The method includes the steps of defining attributes and inheriting a first method from a superclass. The first method defines the first task to be performed in response to a first event. A second method is overridden from the superclass, including the steps of defining a second task to be performed at a second event. An application is created which includes a dialog box. The application includes a reference path to the first and second methods. The first method and the second method can be compiled without coupling the application.

These and other objects and advantages of the invention will appear more clearly from the following description in which the preferred embodiments of the invention have been set forth in detail in conjunction with the drawings.

BRIEF DESCRIPTION OF THE DRAWINGS

FIG. 3 shows an overview of the systems software.

FIG. 4 is a symbolic representation of the structure of a file.

DESCRIPTION OF THE PREFERRED EMBODIMENTS

I. Hardware Overview

Figure 1:
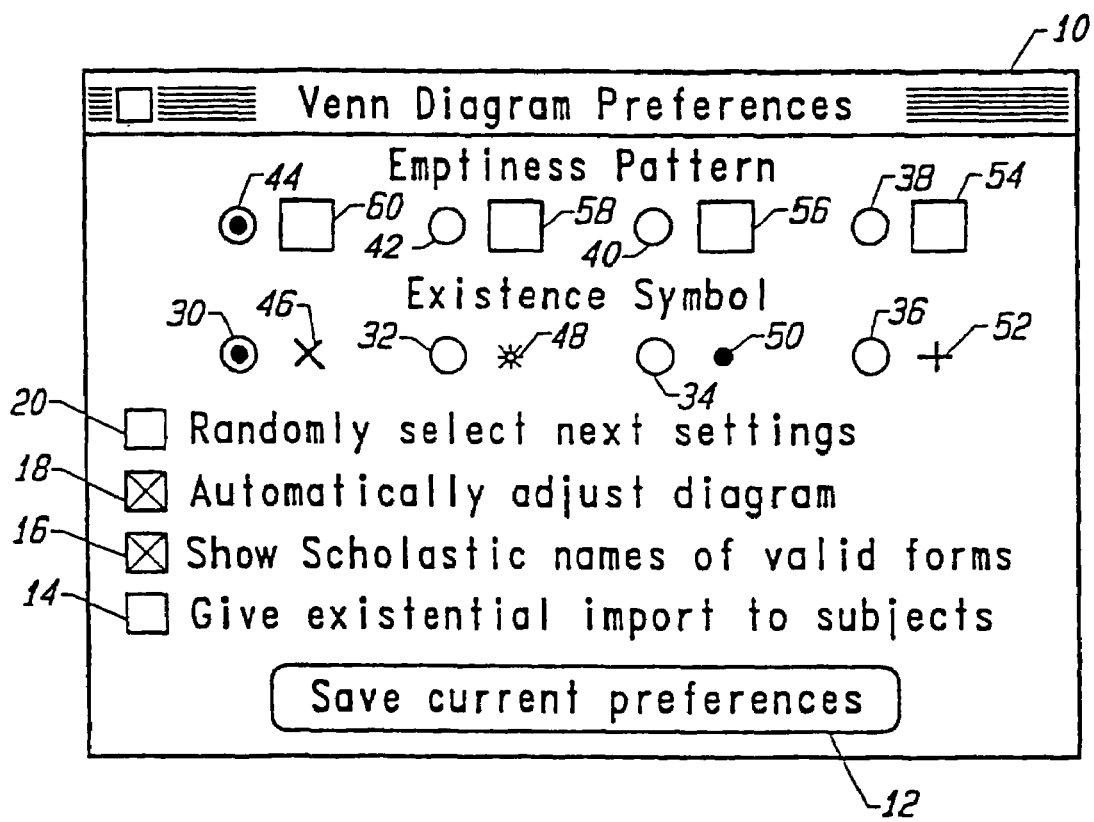
FIG. 1 shows a dialog box.
Figure 2:
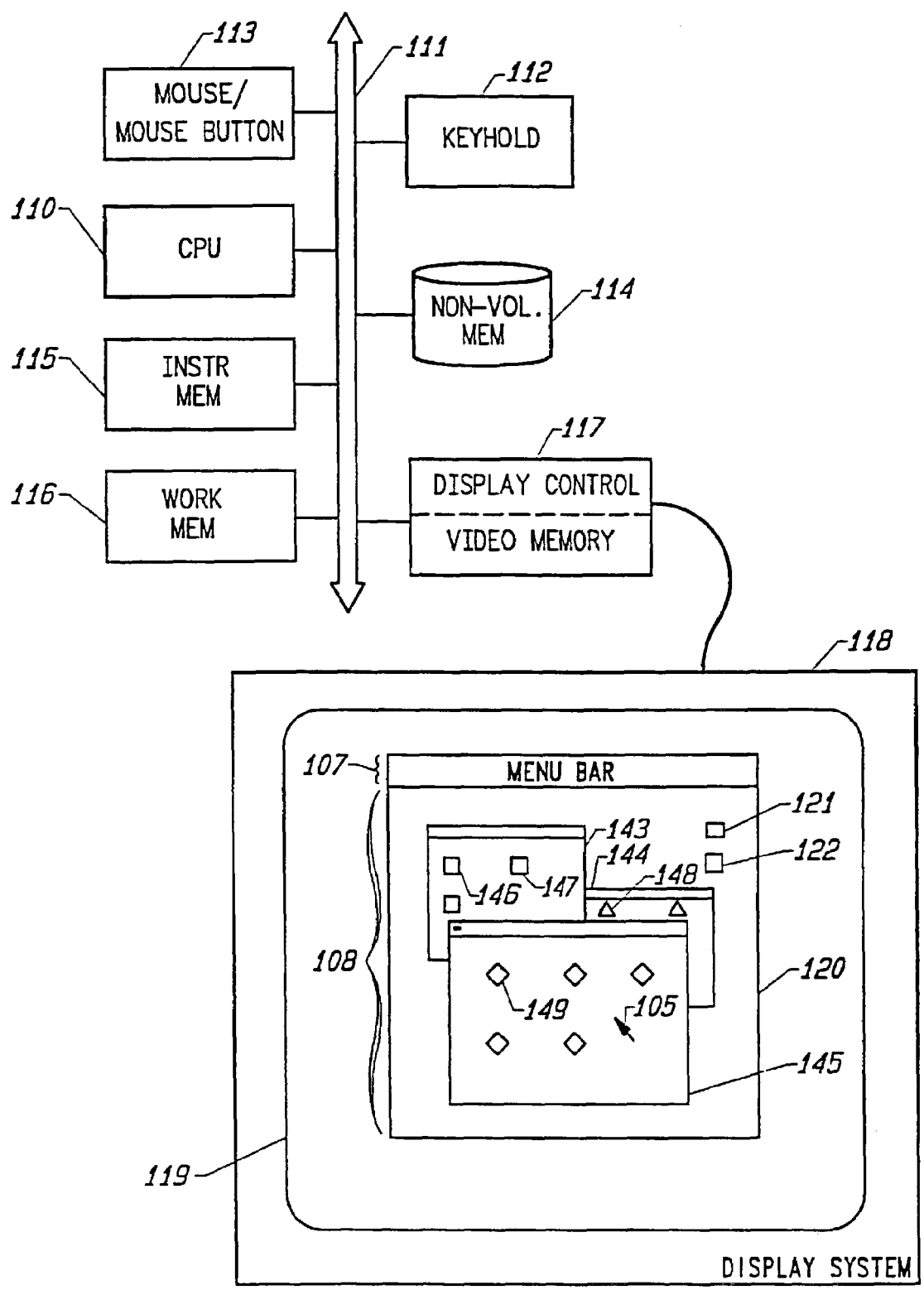
FIG. 2 is a block diagram of a computer system which can be used to implement the features of the present invention.

FIG. 2 illustrates a computer system which can be used to implement the features of the present invention. The computer system includes a host CPU 110 coupled to a system bus 111. The system includes a keyboard 112, a mouse 113 including a mouse button, or other pointing device, and a non-volatile memory 114, such as a hard disk, floppy disk, non-volatile integrated circuit memory system, or the like. Similarly, instruction memory 115 and working memory 116 are coupled to the bus 111. The instruction memory 115 stores window management software, among other software needed for operation of the system. The working, memory 116 is used to maintain various tables needed by the software in the instruction memory 115 in order to maintain the display.

The system also includes a display controller 117 which includes video memory. The display controller 117 drives a display 118 such as a CRT video monitor, LCD flat panel display, or the like. The display system 118 has a screen, generally 119. On screen 119, a workspace 120 is displayed. Workspace 120 is implemented with a desktop metaphor in the Macintosh type systems with a menu bar region 107 for pull-down menus, and a window region 108 for displaying windows and icons. Within the window region 108 of the desktop 120, a plurality of identifiers may be displayed, such as the identifier 121 representing a hard disk drive, the identifier 122 representing a floppy disk, and other identifiers not shown which represent files, applications, control panels, or enclosures which enclose other objects. Also in the window region of the desktop 120, a plurality of windows, such as windows 143, 144, and 145 may be opened. The windows 143, 144, and 145 enclose identifiers, such as identifiers 146 and 147 in window 143, identifier 148 in window 144, and identifier 149 in window 145.

Windows may overlap other windows, so identifiers in one window can become obscured by another window. But the entire surface of the identifier is "hot" during a drag, so the user only needs leave one pixel showing an identifier for the entire identifier to be accessible.

In the figure, the identifiers are shown as graphical elements, or icons. Alternative identifiers may be textual elements, such as the name of the corresponding object. The behaviors described herein may be applied to both textual and graphical elements, as may occur in windows opened in a view by name mode or a view by icon mode in Macintosh computers.

Displayed within the desktop 120 is the cursor 105. In order to identify a particular desired icon, the user moves the cursor on the display by moving the mouse 113 in a corresponding motion. When the cursor is positioned over one of the icons, the icon automatically changes to reverse video. The user can click on that icon using the mouse button, and can drag it to another icon, either in the same window or in a different window, and then release the mouse button to indicate selection of objects corresponding to both the first and second icons.

II. Software Overview

System software is used to implement the various functions of the computer and to provide routines available for application developers to call or include in an application. Systems software routines can be logically divided into functional groups, usually known as managers, that handle specific tasks or user interface elements. For example, the Window Manager allows an application to create, move, hide, resize and otherwise manipulate windows. Similarly, the parts of the system software that allow a developer to create and manipulate menus belongs to the Menu Manager. An application can call system software routines to create standard user interface elements and to coordinate its actions with other open applications. FIG. 3, which depicts an overview of the systems software, shows a user 140 engaging the mouse 113 and keyboard 112. Via a user interface 142, the user 140 interacts with application 146. User interface 142 typically includes a display system; for example, as described in FIG. 2. The application interacts with toolbox 148, operating system 150 and additional system software 152.

Toolbox 148 is used to implement the user interface, resource management, sound input and output, text and graphics. The toolbox offers a common set of. routines that applications can call to implement various functions. The toolbox ensures familiarity and consistency for the user and helps reduce an application's code size and development time. The toolbox is logically divided into functional groups, usually known as managers, that handle specific tasks for user interface elements. Following, is a description of some of the various managers a given toolbox can have. A more detailed description of the toolbox and system software can be found in "Inside Macintosh, Overview," Apple Computer, Inc., 1992, Addison-Wesley. Publishing Company, incorporated herein by reference; and "Inside Macintosh, Macintosh Toolbox Essentials," Apple Computer, Inc., 1992, Addison-Wesley Publishing Company, incorporated herein by reference.

The Window Manager allows a developer to create and manage windows of various types. The Dialog Manager allows a developer to create and manage dialog boxes. The Control Manager allows the developer to create and manage controls such as buttons, radio buttons, check boxes, pop up menus, scroll bars, and application-defined controls. The Menu Manager allows the developer to create and manage an application's menu bars and the menus it contains. The Menu Manager also handles the drawing of menus and user actions within a menu. The TextEdit Manager provides 'simple text-formatting and text-editing capabilities, such as text input, selection, cutting and pasting. Applications that are not primarily concerned with text processing can use the TextEdit Manager to handle most text manipulation. The Resource Manager allows an application to read and write resources. The Finder Interface Manager allows an application to interact with the finder, the application that helps keep track of files and manages the users desktop display. The Scrap Manager allows an application to support cutting and pasting of information among applications. The Help Manager allows an application to provide balloon help on-line assistance. The List Manager allows an application to create a visual list of items. The Sound Manager provides sound output capabilities. The Sound Input Manager provides sound input capabilities for computers equipped with a sound input device such as a microphone. Each of the various managers can call other managers to perform tasks. For example, the Dialog Manager can call the Window Manager to set up a window for a dialog box.

The operating system provides routines that allow for performance of basic low level tasks such as file input and output, memory management, and process control. Toolbox 148 can call operating system 150 to perform low level operations. An application may also be able to call operating system 150 directly.

The toolbox allows for the creation and management of parts of an application's user interface, and in some sense mediates between the application and the user. By contrast, the operating system essentially mediates between the application and the hardware. For example, an application does not read and write files by reading data directly from the medium from which they are stored. Rather, the application calls appropriate File Manager routines. The File Manager locates the desired data within the logical hierarchal structure of files and directories that it manages: Then, the File Manager calls the Device Manager to rewrite the data on the actual physical device. The File Manager and the Device Manager thereby insulate an application from the low level details of interacting with the available data storage hardware. Thus, toolbox 148 can be thought of as a level above operating system 150. An alternative embodiment may have the toolbox at the same level.

Below is a description for the various main components of a preferred operating system. The Process Manager handles the launching, scheduling and termination of applications. It also provides information about open processes. The Memory Manager manages the dynamic allocation and releasing of memory in an applications memory partition. The Virtual Memory Manager provides virtual memory services. That is, the ability to have a logical address space that is larger than the total amount of available RAM. The File Manager provides access to the file system; allows applications to create, open, read, write, and close files. The Alias Manager helps locate specified files, directories, or volumes. The Disk Initialization Manager manages the process of initializing disks. The Device Manager provides input from and output to hardware devices attached to the computer: The SCSI Manager controls the exchange of information from the computer and a peripheral device attached to a Small Computer Standard Interface (SCSI). The Time Manager allows for the execution of a routine periodically or after a specified time delay. The Vertical Retrace Manager allows the synchronization of the execution of a routine with the redrawing of the screen. The Shutdown Manager allows for the execution of a routine while the computer is shutting down or restarting.

The system software includes a number of other parts, collectively called additional system software 152, that do not historically belong to either the toolbox 148 or the operating system 150. Additional system software 152 provides an extremely powerful set of services that can be used to handle text and to support the varying text handling requirements of different languages and writing systems. The additional system software 152 also includes an Inter-Application Communications Architecture (IAC) and a communications toolbox.

The IAC provides a standard and extensible mechanism for communication among applications. The IAC architecture includes the following main parts. The Edit Manager allows applications to automate, copy and paste operations between applications, so that data can be shared dynamically. The Event Manager allows applications to send and respond to events. The Program to Program Communications Toolbox (PPC) allows applications to exchange blocks of data with each other by reading and writing low-level message blocks. It also provides a standard user interface that allows a user working in one application to select another application with which to exchange data.

The system software routines can be stored in a library and linked to an application. In the preferred embodiment, these routines reside in a read only memory (ROM), provided by special chips in the computer. When an application calls a routine, the operating system intercepts the call and executes the appropriate code contained in the ROM. This mechanism provides a way for the operating system 150 to substitute the code that is executed in response to a particular system software routine. Instead of executing the ROM based code for some routine, the operating system may choose, at the instruction of the application developer, to load some substitute code in the computer's RAM. Then when the application calls the routine in question, the operating system intercepts the call and executes the RAM based code. RAM based code that substitutes for ROM based code is called a patch. Patches are, usually stored in the system file, located in the system folder. The system file also contains collections of data, known as resources, that applications can use to help present the standard user interface. Another method for adding capabilities to the system software is to include executable code of new routines as a system extension. Extensions are stored in a special location, the Extension Folder in the System Folder, and are loaded into memory at system startup time.

When an application calls a system software routine, it generally does not matter whether the code that is executed resides in ROM, is a patch in RAM loaded from the system file, or is part of a RAM-based extension. It is, however, important that appropriate code exists in at least one of these locations, because the application will crash if it attempts to call a routine that is not defined anywhere.

The system software breaks up the users actions into component events, which are passed one by one to an application for handling. For example, when a user 140 passes a key on the keyboard 112, the system sends the application information about that event. Alternatively, an event could be the user 140 clicking on the mouse 113 or placing a disk 160 in a disk drive 162. The event information passed to the application includes which key was pressed, when the key was pressed and were there any modifier keys (for instance, the Command key) were being held down at a time for the key press and so forth. Applications respond to the event by performing whatever actions are appropriate. Applications may receive many types of events. Events are usually divided into three categories: low-level events, operating system events and high-level events. The Event Manager returns low-level events to an application for occurrences such as the user pressing the mouse button, releasing the mouse button, pressing a key on the keyboard or inserting a disk. The Event Manager also returns low-level events to an application if the application needs to activate a window (that is, make changes to a window based on whether it is in front or behind another window) or update a window (that is, redraw the windows contents). When, the application requests an event and there are no other events to report, the Event Manager returns a null event. The Event Manager returns operating-system events to an application when the processing status of the application is about to change or has changed. For example, if a user brings an application to the foreground, the Process Manager sends an event through the Event Manager to an application. Some of the work of reactivating an application is done automatically, both by the Process Manager and by the Window Manager. Applications must take care of any further processing needs as a result of an application being reactivated. The Event Manager returns high-level events to an application as a result of communication directed to the application from another application or process.

FIG. 4 is a symbolic representation of the structure of a file in the preferred embodiment. File 160 has a data fork 162 and a resource fork 164. File 160 is treated as a named, ordered sequence of bytes stored on a volume and divided into two forks. The data fork 162 contains data that usually corresponds to data created by the users. The application creating the file can store and interpret the data in the data fork in whatever manner is appropriate. Resource fork 164 consists of a resource map and the resources themselves. A resource is any data stored according to a defined structure. The data in the resource is interpreted according to the resource type. Resources can be created by compiling code, using a resource compiler, or using a resource editor. When data is written to a file, it is either written to the file's resource fork or the file's data fork. Data is typically read from the data fork using the File Manager routines, and read from and written to a resource fork using the Resource Manager.

Resources typically store resources data that has a defined structure, such as icons, sounds, and descriptions of menus, controls, dialog boxes and windows. When a resource is created it is assigned a resource type and resource ID. A resource type is a sequence of characters that uniquely identifies a specific type of resource, and a resource ID identifies by number a specific resource. Examples of resource types include CODE, DLOG, DITL, and ICON. An ICON resource type is used to define an icon. A WIND resource is used to define a window. A DLOG resource is used to define a dialog box. A DITL resource is used to define a dialog item list (which is a list of items in a given dialog box). Resources specific to a given application, such as descriptions of windows, menus, controls and dialog boxes, are stored in the resource fork of the given application. A resource fork has a resource map which contains entries that provide the location of each resource in the resource fork. When the Resource Manager opens the resource fork of a file, it reads the resource map into memory. As the Resource Manager reads resources into memory, it replaces their entities in the resource map with handles to the data in memory.

When a user opens an application, the system software opens the application's resource fork. When the application opens a file, the application typically opens both the files data fork and the files resource fork. When the application requests a resource from the Resource Manager, the Resource Manager files a specific search order. The Resource Manager normally looks first for the resource in the resource fork of the last file that the application opened. If the Resource Manager does not find the resource there, it continues to search each resource fork open to the application in reverse order that the files were opened. After looking in the resource forks of files the application has opened, the Resource Manager searches the application's resource fork. If it is not found, the Resource Manager searches the resource fork of the system file.

III. Dialog Boxes

Figure 5:
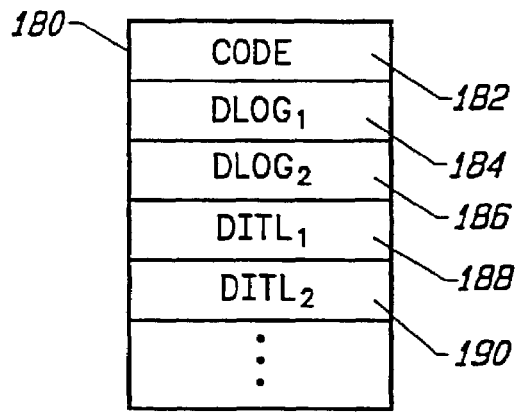
FIG. 5 is a symbolic representation of a resource.

A dialog box was previously described in the background of the invention. This section provides further details of the preferred embodiment dialog box. When creating a dialog box, the application developer needs to define a dialog resource (DLOG) and a dialog item list resource (DIFL). The Dialog Manager gets most of the descriptive information about dialog boxes from these resources. FIG. 5 shows the resources for an application that contains dialog boxes. Resource fork 164 includes a first resource for storing code 182. The application calls for two dialog boxes; therefore, resource 164 includes two dialog resources: $DLOG_1$ 184 and $DLOG_2$ 186. For each dialog resource there is a corresponding dialog item list. Thus, $DLOG_1$ 184 corresponds to $DITL_1$ 188, and $DLOG_2$ 186 corresponds to $DITL_2$ 190.

Figure 6:
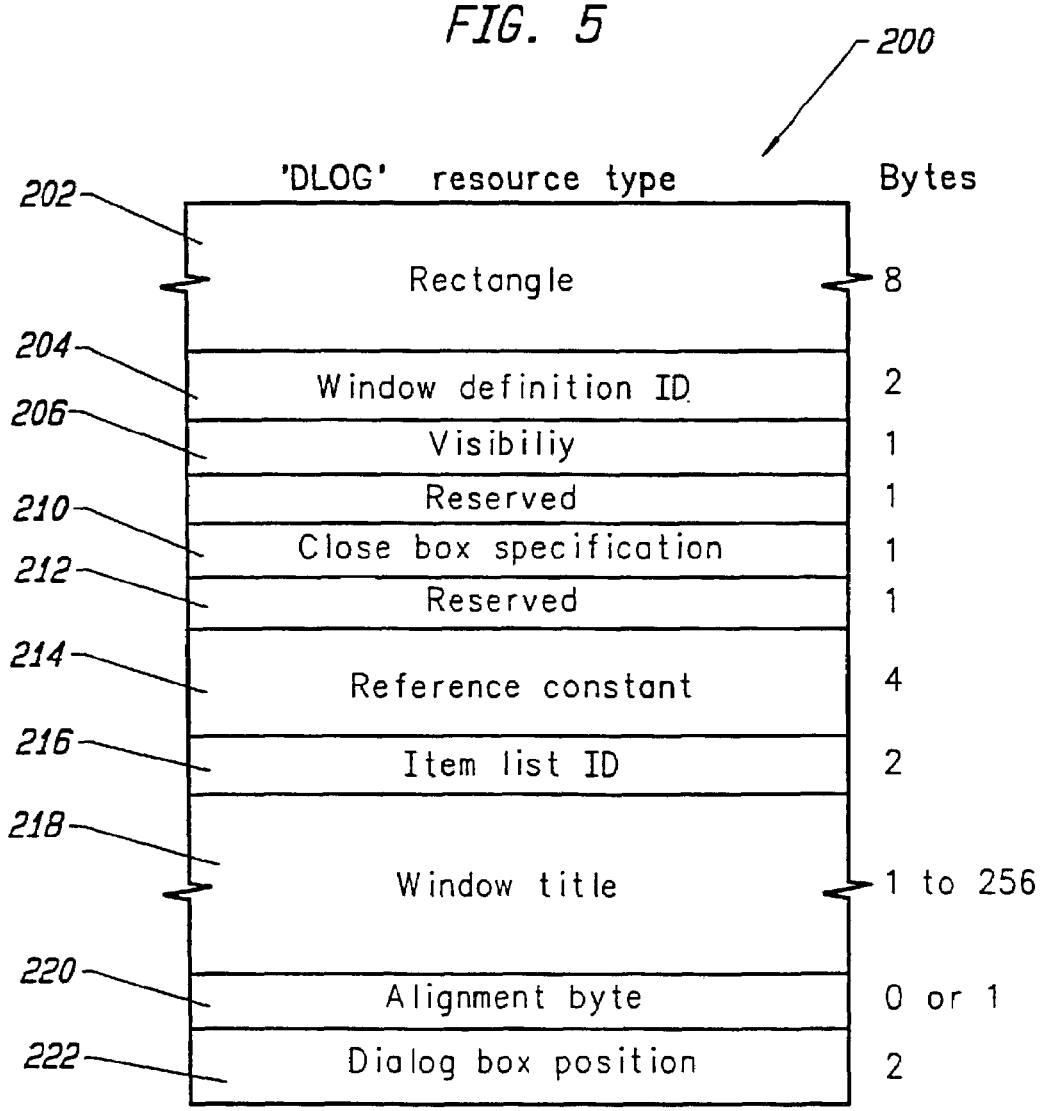
FIG. 6 is a symbolic representation of the structure of a dialog resource.

FIG. 6 shows a structure of a DLOG resource 200. Rectangle field 202 determines the dialog box's dimensions. Window definition ID 204 (ProcId) is used to determine what type of dialog box is being defined. For example, types of dialog boxes can include dialog boxes that can be moved across the screen (i.e. dragged with a mouse), dialog boxes which must be dismissed by a user action before any other actions can take place (modal dialog box), and dialog boxes which can be used now or put in the background and used later. If the visibility field 206 is set to a value of 1, the Dialog Manager displays this dialog box as soon as the dialog box is called in the application. Alternatively, the dialog box can be defined and set up in memory when called, and would require a draw dialog box command to be displayed. Close box specification 210 specifies whether to draw a close box. A close box is a box drawn in the dialog box that, when clicked on, causes the dialog box to be closed. Field 212 is reserved and field 214 is reference constant (refCon), which contains any data that an application stores here. For example, an application can store a number that represents an item of data, or a pointer to data. Item list ID 216 is the identification of the item list resource (DITL) that specifies the items in the dialog box. Window title 218 is a Pascal string displayed in the dialog boxes title bar. Alignment by 220 is an extra byte added if necessary to make the previous Pascal string end on a word boundary. Dialog box position 222 specifies the position of the dialog box on the screen.

Figure 7:
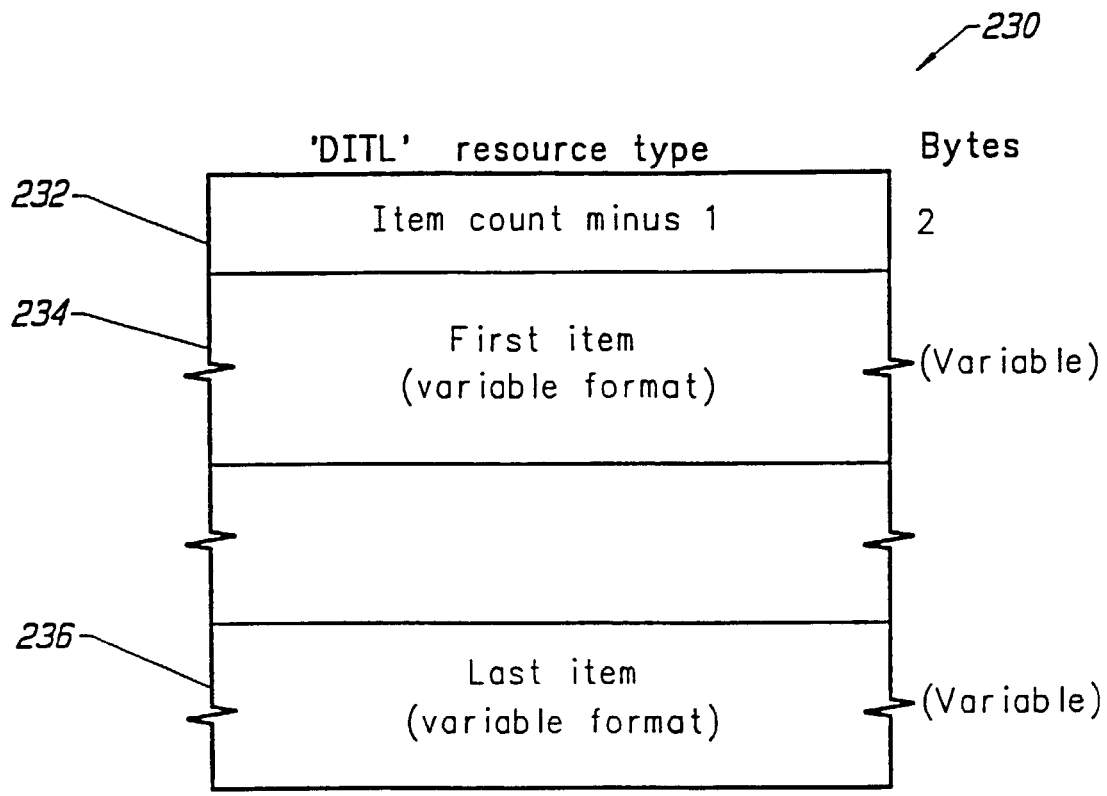
FIG. 7 is a symbolic representation of the structure of a dialog item list resource.

A dialog item list (DITL) resource is used to specify what items are being included in the dialog box. The format and structure of a DITL 230 is shown in FIG. 7. Field 232 (item count minus 1) stores the value of one less than the total number of items defined in this resource. Below that count is a variable number of items (234 . . . 236 . . . ).

Figure 8:
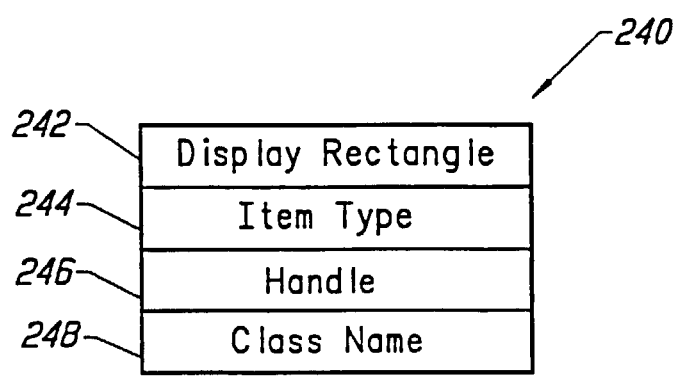
FIG. 8 is a symbolic representation of the structure of an IDO item in the dialog item list resource.

FIG. 8 shows the format of an individual IDO item 240 in a DITL. Display Rectangle 242 is used to define the size and location of the item in the dialog box. The display rectangle is specified in corners local to the dialog box; these corners specify the upper left and lower right hand corners of the item. Item Type 244 contains a value which indicates the type of item being defined. For example, this field may be loaded with a first constant if the item type is a button, a second constant if the item type is a check box, a third constant if the item type is Nan IDO, etc. Handle 246 is a pointer which references a class (classes are discussed below). IDO Class Name 248 stores the name of the class (referencing the class) which defines the IDO.

IV. Object Oriented Programming

The IDO of the present invention is a product of object oriented programming. In object-oriented programming, action and data are closely coupled. That is, when a programmer defines data, action can also be defined. Instead of a set of routines that do something to data, there is a set of objects interacting with each other.

An object is an entity that contains some data and an associated set of actions that operate on the data. To make an object perform one of the actions, the object is sent a message. For example, one might create an object that represents a rectangle. Its data contains the locations of the rectangles four corner points and its actions might include drawing, erasing and moving. To draw a rectangle, one sends a draw message to the rectangle.

Every object belongs to a class, which defines the implementation of a particular kind of object. A class describes the object's data and how the object responds to a message. An object is called an instance of a class.

Classes are very much like record declarations. A programmer defines the private data for the class similar to the fields of a record. In classes, the fields are called instance variables (or attributes). Each instance of a class has its own instance variables just as each variable of a record type has the same fields. When a message is sent to an object, a software routine implements that message. This routine is called a method. Thus, a class definition includes instance variables and methods. One important thing to keep in mind is that message and method are not the same. A message is what is sent to an object. How an object responds to a message is the method. Thus, a given class will have a class name, instance variables, messages that it can be sent, and methods it will carry out when received a particular message.

A class can be defined in terms of an existing class. The new class is called the subclass and the existing class is called the superclass. A class without a superclass is said to be a root class. A subclass inherits all the instance variables and methods of its superclass. Inheriting means that a variable or method existing in a given class will automatically exist in the subclass. Subclasses can define additional instance variables and methods. Subclasses can also override methods defined by the superclass. Overriding a method means creating a new set of instructions such that the subclass responds to the same message as a superclass but uses its own method (new method) to respond to the message. If a method is not overridden, the subclass responds to the method in the same manner as the superclass.

Figure 9:
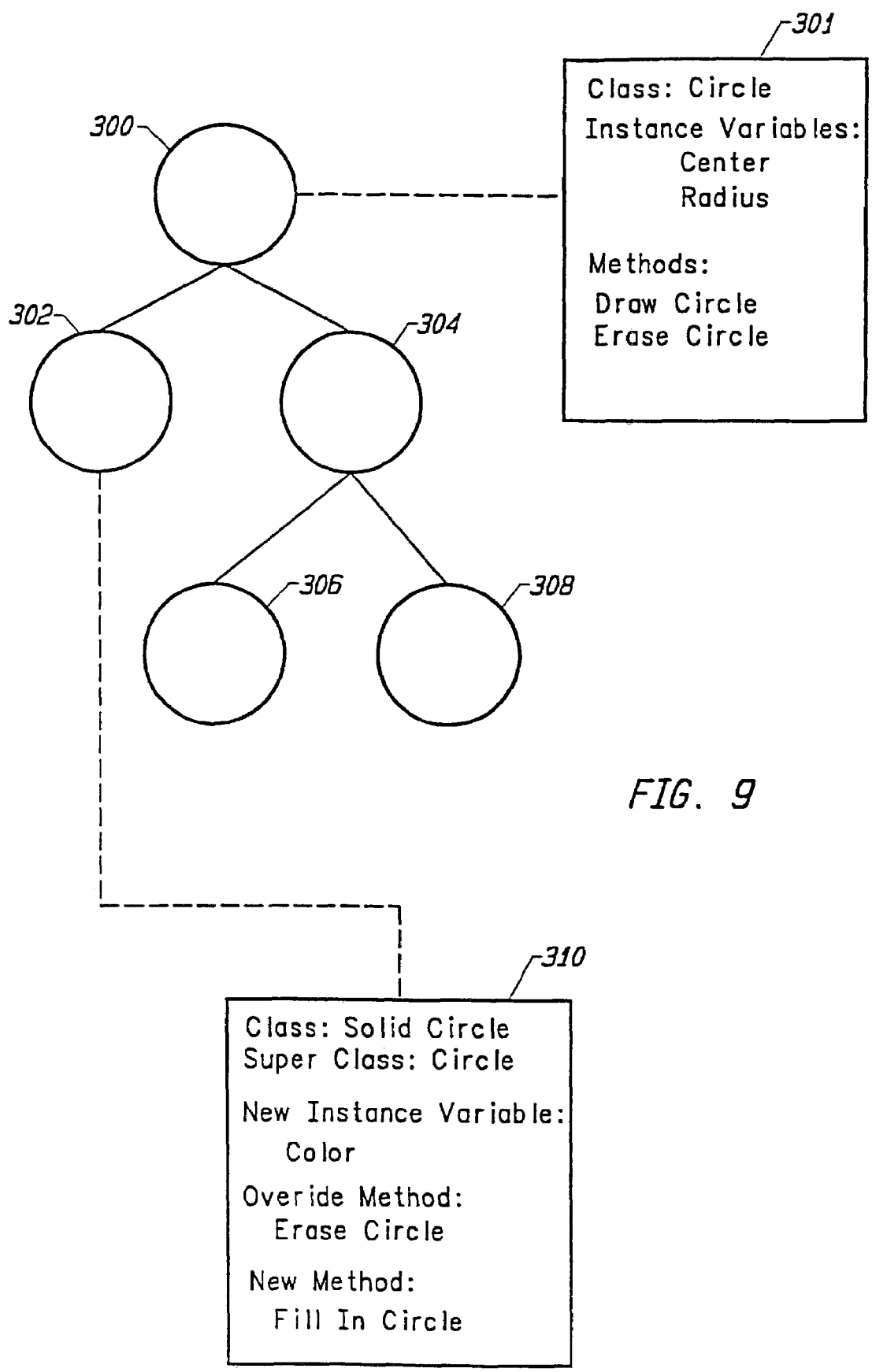
FIG. 9 is a symbolic representation of a class library.

FIG. 9 shows a hierarchical class library (or class structure or class hierarchy). Class 300 represents the root class. Class.302 is a subclass of the root class. Class 304 is also a subclass of the root class 300. Class 304 also has subclasses 306 and 308. Therefore, class 304 is a superclass of 306 and 308, but a subclass of class 300. Thus, any method defined in class 300 can be inherited in classes 304, 306 and 308. If class 304 overrides a method in class 300, class 306 and class 308 inherit the new method. For example, class 300 defines how to draw a circle (see box 301), and has two instance variables, Center and Radius. Class 300 also has two methods: DrawCircle and EraseCircle. The DrawCircle method draws a circle when class 300 received the message "DrawCircle." When class 300 receives the message "EraseCircle," the method EraseCircle erases the circle that was drawn. Subclass 302 contains one additional instance variable: Color. That means that class 302 also inherits Center and Radius from class 300. Furthermore, class 302 inherits DrawCircle from class 300. Class 302 however, overrides the EraseCircle, so that when a message "EraseCircle" is sent to an object of class 302 a new EraseCircle method is performed. Class 302 also includes another method, FillInCircle, that fills in a previously drawn circle to make it solid. The ink used to fill in the circle is designated by the variable Color. Thus, a routine trying to draw a circle that is solid sends a message first indicating the value of Color, next send a message of Radius, next send a message of Center, next send a message indicating to DrawCircle and then send a message indicating to FillInCircle. When the application is done a message is sent to EraseCircle. Box 310 represents an object, which is an instance of class 302. Object 310 is created in an application. Within the application, messages can be sent to object 310.

V. System Object Model

IBM's System Object Model (SOM) which is known in the art, is a technology for packaging object-oriented class libraries. SOM allows objects in classes to be shared and imported across languages, and it does not compete with such languages as SmallTalk, C++ or any other programming language. Instead, SOM compliments languages because SOM is not so much a language technology as it is a packaging technology for binary code. This feature lets vendors ship properly compiled object libraries without source code. SOM allows the creation of language independent objects. This means that class libraries built with SOM in one language can be used and extended by client programs written in another language. SOM allows a developer, because of its breakdown of the language barrier, to more easily change the implementation details of a SOM class—such as adding new methods, editing or deleting variables, inserting new parent class in the inheritance hierarchy, removing methods outwards in the hierarchy—without requiring client programs to be recompiled. This enhances the ability to distribute truly upward compatible class libraries. Although SOM is used in the preferred embodiment, SOM can be replaced by another model, or by an environment where language compatibility is not a problem. More information about SOM can be found in "OS/2 2.1 Application Programmer's Guide," by Jody Kelly, Craig Swearingen, Dawn Bezviner and Theodore Shrader, 1994, Van Nostrand Reinhold, incorporated herein by reference.

VI. Interface Definition Objects

An IDO is an object used to define an item in a dialog box. An IDO is an instance of a class. The class library (or class hierarchy or class structure) is set up using SOM. Each class will define a different type of item. For example, a button can be defined with one class, an icon can be defined with a second class, a box can be defined with a third class, etc. An IDO is an object (or instance) of one of these classes.

Since an IDO is an instance of a class, the class inherits all the methods and instance variables of the superclass. The class hierarchy used has a base class. The base class is a relative root class. A base class can be the same as a root class or, a base class can be a subclass of a root class. The base class is the effective or relative root class for a species of objects. Thus, for purposes of dialog boxes one particular class in a perhaps giant system class hierarchy will serve as the base class. In effect, this may not be the root class for the entire class hierarchy. However, for purposes of dialog boxes it will appear to be the root class. Alternatively, there may be a separate class hierarchy for dialog boxes; therefore, the base class would also be the root class. Below is an example of one type (the preferred embodiment) of a base class for an IDO.

BASE CLASS

Copyright Apple Computer, Inc. 1994

```
#include <somobj.idl>
#include <somcls.idl>
#include <types.IDO>
interface DialogItemDefinitionObject : SOMObject
{
    /* attributes (or fields) */
    attribute DialogRef         fDialog;
    attribute DialogItemIndex1  fIndex;
    attribute Rect              fRect;
    attribute short             fIdleTimeWaitPeriod;
    /* following are the methods */
    /* initialization and disposal */
    void Initialize ( );
    void Dispose ( );
    /* editing item data - for resource editors */
    void EditStaticData ( );
    /* handle specific events */
    void DoDraw ( );
    void DoIdle ( );
    void DoActivate (in boolean isActive);
    void CursorEnteredRect ( );
    void SimulateClick ( );
    void SetKeyboardFocus (in boolean isFocus);
    boolean DoMouseDown (in EventRecord *theEvent);
    boolean DoKeyDown (in EventRecord *theEvent);
    /* drag manager routines */
    boolean DragEnteredItem (in DragReference theDrag);
    void DragInItem (in DragReference theDrag);
    void DragLeftItem (in DragReference theDrag);
    OSErr DropInItem (in DragReference theDrag);
    /* utility routines - these should never be overridden,
     * and are intended to be callable only by subclasses */
    OSErr GetProperty (in OSType propertyType,
            in void *propertyData, in unsigned long propertySize,
            out unsigned long actualPropertySize);
    OSErr SetProperty (in OSType propertyType,
            in void *propertyData, in unsigned long propertySize);
    Handle GetResourceFromMyChain (in OSType resType, in short resID);
    implementation {
        passthru C__h = "#include <Dialogs.h>";
        /* Release Orer. Note, only append to the end of this
         * list, so that the base class is forward compatible. */
        releaseorder: fDialog, fIndex, fRect, fIdleTimeWaitPeriod,
        Initialize, Dispose, GetData, EditStaticData, DoDraw,
        EraseBackground, DoIdle, DoActivate,
        CursorEnteredRect, SimulateClick, SetKeyboardFocus,
        DoMouseDown, DoKeyDown, _get_fDialog, _set_fDialog,
        _get_fIndex, _set_fIndex, _get_fRect, _set_fRect,
        _get_fIdleTimeWaitPeriod, _set_fIdleTimeWaitPeriod,
        DragEnteredItem, DragInItem, DragLeftItem, DropInItem,
        GetProperty, SetProperty, GetResourceFromMyChain;
    };
};
```

The following is a description of the fields of the base class.

"DialogRef fdialog" indicates the dialog box that owns this item. "DialogItemIndex1 fIndex" indicates the term of that item within the dialog box. Thus by using fDialog and fIndex, the IDO can access and set any generic information for itself by using GetDialogItem and GetDialogItemProperty, etc. "Rect frect" indicates the item's bounding rectangle (in coordinates local to the dialog in which it resides). "Short fIdleTimeWaitPeriod" specifies how long (in 1/60 of a second) the Dialog Manager should wait in between calls to this item's idle procedure. Thus, any item can receive idle time. If the item does not need idle time, it should set this field to kDoesNotNeedIdleTime (−1). By default, items will not get idle time.

The following text describes the methods of the base class. Note that if a class only performs standard behavior, for a given method, then the class does not have to override the method of the superclass. The Dialog Manager will call through to the item's inherited method if no method is implemented by the class. Usually, the behavior defined in the base class will involve doing very little or doing nothing.

"Initialize (void)" is called when an instance of the IDO is created (at dialog box creation time) to allow the IDO to set its fields appropriately. The IDO calls the inherited SetData before doing any of its own work, to do the default initialization tasks. This includes setting the appropriate value for fIdleTimeWaitPeriod. (By default this is set to −1. If a dialog item needs idle time, it should set fNeedsIdleTime to the number of ticks desired between calls to the DoIdle method.)

Before this method is invoked, the Dialog Manager will have set all of the IDO item's properties that define its static startup data. (For example, a text displaying IDO has a property of type "TEXT" that specifies its initial text.) The IDO can access any of these properties by a GetProperty utility method.

"Dispose (void)" is called at disposal time for the item (usually when its dialog is disposed) so that it can be free any dynamically allocated data.

"GetStaticData (void)" is called when the Dialog Manager heeds an encapsulated form of the item's data (that it can read in with the SetData method).

"EditStaticData (void)" is called to allow an item to be edited. It is similar to what happens when somebody double clicks on a dialog item in ResEdit: a dialog box is displayed on the screen allowing the user to specify specific fields for the item.

"DoActivate (Boolean isActive)";is called when the item's dialog receives an activate event. IsActive is true when the item should be activated, and false when it should be deactivated.

"DoDraw (void)" is called when an item redraws itself. The IDO can assume that its port (its dialog) has been set, and that its state (including the port's pen style, text info, etc.) will be preserved, regardless of what the IDO does when it draws itself. The IDO can also assume that the EraseBackground method has been called already.

"CursorEnteredRect (void)", is called when the cursor has entered the item's rect. If the IDO wants to change the cursor at this time, it implements this method; otherwise, it does not have to.

"DoMouseDown (EventRecord *theEvent)" is called when the user has clicked inside the item's rect. The method returns true if it has been selected by the user, indicating that the Dialog Manager sends the item's index back to the application through DialogSelect or ModalDialog (in the parameter itemHit).

"DoKeyDown (EventRecord *theEvent)" is called to react to a DoKeyDown event (depressing a key on the keyboard). The return value is similar to the return value of DoMouseDown.

"SetKeyboardFocus (Boolean isFocussed)" is called when the user has tabbed or clicked into (or out of, depending on the value of isFocussed) the item's area and it now has keyboard focus, and thus, should draw itself differently.

"DragEnteredItem (DragReference theDrag)" is called when a Drag Manager drag has entered the IDO item's bounding rect. If this item can accept this drag, it should call ShowDragHilite, and return true. Otherwise, it should return false.

"DragInItem (DragReference theDrag)" is called when a drag continues over the given IDO item. It is only called if this item returned true in the DragEnteredItem routine. This method draws an insertion point or do any item-specific drag feedback as appropriate.

"DragLeftItem (DragReference theDrag)" is called if a drag is leaving this item's bounding rectangle. The Dialog Manager will call HideDragHilite before calling this method, but any other drag-tracking cleanup duties should be performed here.

"DropInItem (DragReference theDrag)" is called when the dialog receives a drag in this item's bounding rectangle. It is the item's duty to take the data in the drag and update its own data accordingly. The method returns any OSErr that is valid for a DragReceiverHandler (see the Drag Manager documentation for details.)

The following utility methods are implemented in the base class for an IDO, intended as utility routines for use by any subclassed IDO item. These methods should not be overridden.

"SetProperty (OSType propertyType, void* propertyData, unsigned long propertysize)" allows an item to assign data of any type and size to itself, such that it is (a) accessible by the item, application or the Dialog Manager, and (b) arbitrarily storable in a "flat" manner, so that any item can arbitrarily store its static data in a consistent manner. This routine calls through to SetDialogItemProperty to accomplish this.

"GetProperty (OSType propertyType, void* propertyData, unsigned long propertySize, unsigned long* actualPropertySize)" is the complement to the GetProperty method, allowing the item to access any arbitrary property.

"Handle GetResourceFromMyChain (OSType resType, short resID) sets up the resource chain such that the IDO's resource fork is included. This allows IDO's resource to be bundled with associated resources.

As described above, each class can have many methods. When a message is sent to a object by the Dialog Manager, only one method need be invoked. Thus, the Dialog Manager enters the object at the particular method. That is, each method can be looked at as an entry point. If only one method needs to be executed, there is no reason for the computer to read or execute other lines of code that are not pertinent to that one method. Thus, it is said that each object has multiple points of entry. Each point of entry being at a method.

In Appendix A is a more detailed code listing for each method in the base class. Most of the methods in the base class set up definitions for development in subclasses. The next step is to set up subclasses. Since each subclass is part of the class hierarchy, the subclasses may inherit all the instance variables, or attributes, and the methods from the base class. The developer overrides the methods in the base class as necessary in order to perform the behavior of the desired item. Overriding a method includes adding instructions (source code) to define a list of steps to be taken when a message is received invoking that method.

For example, one subclass might define how to draw a rectangle as a box. Then, if an application developer needed a rectangle as an item in a dialog, the developer sets up an object referencing that particular subclass. If an application developer needed a box which had text inside, the developer creates a new subclass from the box subclass. The new subclass, let's call it GroupingRect, will then inherit all the methods from the box subclass. Furthermore, the new subclass may modify some of the methods from the box subclass to add text.

Using IDOs, it is fairly simple to create a new item. A developer looks for the class closest in form to the new item. Once that class is located, the developer merely sets up a new subclass, inheriting all the methods and instance variables. The developer does not need to know all the details of the inherited methods. The developer does not need to know the flow of control of the Dialog Manager. The developer merely needs to override whatever methods are necessary to implement the customization of the new item.

Figure 10:
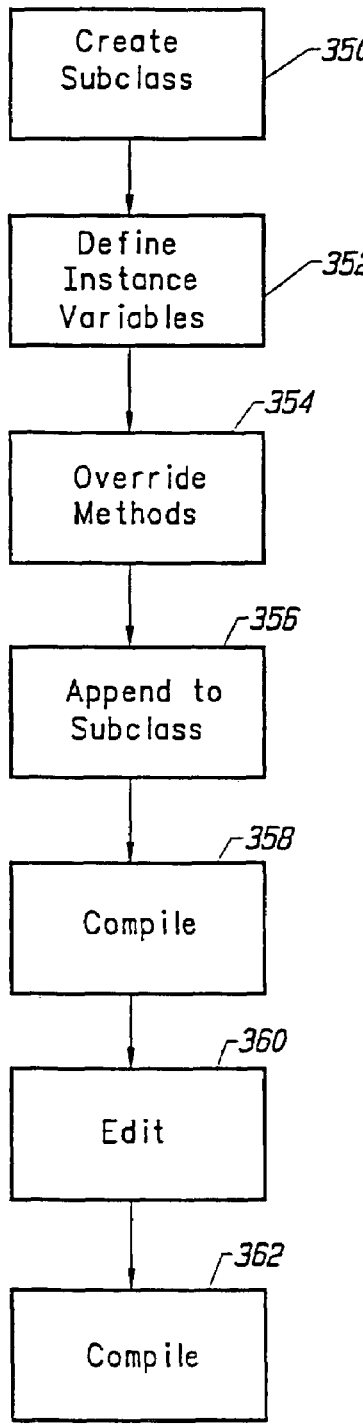
FIG. 10 shows the flow chart describing the method of creating a new item in a dialog box.

FIG. 10 shows the method of creating a new type of dialog item. The first step (350), is to set up a new subclass. Setting up a new subclass requires a linking or interfacing with the class hierarchy. The developer must decide what existing class in the class hierarchy should be the immediate superclass to the new subclass. For example, in the GroupingRect example described below, the immediate superclass is the base class. The developer needs to decide what variables or methods to override and what new methods or variables to add. The developer then (step 352) defines any new instance variables. It is possible that the developer may not need to define any new variables. The developer will then (step 354) override any methods necessary to customize the new item. It is possible that no methods may need to be overridden. The developer may also append to the subclass (step 356). Appending to the subclass includes adding new instance variables and adding new methods. At that point, the developer compiles the subclass (step 358). If the rest of the class hierarchy is already compiled, there is no need to recompile the class hierarchy after compiling a new subclass because the new subclass should be binary compatible with the class hierarchy. Furthermore, if the application program is already compiled, there is no need to compile the application program after compiling the subclass. Development of the item can end at step 358 or it can continue. For example, after using the item or testing the item, the developer may decide that the IDO needs to be edited (step 360). The IDO can be edited by editing text or by using resource editor (see discussion below). After editing is complete, the subclass will need to be compiled again (step 362). When the subclass is recompiled (step 362), there may be no need to recompile the rest of the class hierarchy, the application or the Dialog Manager code.

Figure 11:
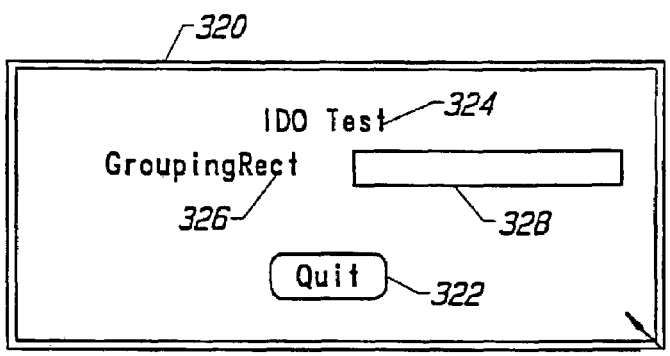
FIG. 11 shows a dialog box with an item defined by an IDO.

In order to better understand an IDO, the following example is presented. FIG. 11 shows a dialog window 320. Dialog window 320 has four items: button 322, StaticText 324, StaticText 326 and GroupingRect 328. GroupingRect 328 is an IDO. GroupingRect is a rectangle.

Let's start with the scenario that a developer is creating an application and decides that a GroupingRect is needed. The GroupingRect is a customized IDO since it does not exist. First, the developer creates a new subclass, a GroupingRect subclass. GroupingRect is a subclass of the base class. Therefore, the GroupingRect inherits the methods and instance variables of the base class. Further, GroupingRect overrides any methods necessary to draw the rectangle. For this example, GroupingRect overrides the function DoDraw. The new DoDraw includes instructions to draw a rectangle. Furthermore, GroupingRect may override the method EditStaticData. Below is code for the GroupingRect class. This code is written in IDL, the native language of SOM.

GROUPING RECT

Copyright Apple Computer, Inc. 1994

```
#include "DialogItemDefinitionObject.idl"
interface GroupingRect : DialogItemDefinitionObject
{
    implementation {
        // method overrides
        DoDraw:            override;
        EditStaticData:    override;
    };
};
    The instructions for the new methods can be written, in C:
#define GroupingRect_Class_Source
#include <Drag.h>
#include <GroupingRect.ih>
/*
##########################################################

DoDraw
FUNCTION: Draw the grouping rectangle
INPUTS:    none
OUTPUTS:   none
RETURNS:   void
*/
SOM_Scope void SOMLINK DoDraw(GroupingRect *somSelf, Environment *ev)
{
    Rect      theRect;
    Str255    theTitle;
    OSErr     theError;
    /* get the title - it's stored in a property */
    theError = _GetProperty (somSelf, ev,
                kTextDialogItemProperty,
```

-continued

```
            (void *) &theTitle[0],
            sizeof (theTitle),
            NULL);
    /* if no title is available, the title defaults to "" */
    if (theError != noErr)
            theTitle[0] = '\0';
    theRect = ___get__fRect (somSelf, ev);
    PenNormal ( );
    FrameRect (&theRect);
}
/*
##########################################################################

EditStaticData
FUNCTION:  Edit the grouping rectangle's static data. Callable by
           ResEdit and other similar resource editing programs.
INPUTS:    none
OUTPUTS:   none
RETURNS:   void
*/
SOM__Scope void SOMLINK EditStaticData(GroupingRect *somSelf,
Environment *ev)
{
    /*
     * this is pseudo-code:
    create a dialog to find out what the title should be;
    wait until the user is done with the dialog;
    if the user selected "ok" {
            get the title that the user entered;
            set my title property to be that title
    }
    otherwise, the user selected cancel. Don't
    bother changing the title.
    */
}
```

Now that a class is set up, the applications developer can create an application that calls a dialog box. The following source code (written in c) shows an application program that calls a dialog box. Although a dialog box was called, there was no mention to what items are in the dialog box. That information is loaded into a resource.

APPLICATION

Copyright Apple Computer, Inc. 1994

```
#include <Dialogs.h>
#include <Quickdraw.h>
#include <TextEdit.h>
#include <Events.h>
#include <TextEdit.h>
#include <Menus.h>
#include <Windows.h>
#include <Fonts.h>
#include <Resources.h>
#if_powerc
QDGlobals qd;
#endif
void main (void)
{
    DialogPtr theDialog;
    short itemHit;
    EventRecord theEvent;
    short i;
    InitGraf (&qd.thePort);
    InitFonts ( );
    InitWindows ( );
    InitMenus ( );
    TEInit ( );
```

-continued

```
    InitDialogs (NULL);
    for (i = 1; i < 10; i++)
            WaitNextEvent (−1, &theEvent, 0, NULL);
    theDialog = GetNewDialog (128, NULL, (WindowPtr) −1);
    while (itemHit != 4)
            ModalDialog (NULL, &itemHit);
    DisposeDialog (theDialog);
}
```

After creating the application program, the applications developer then must set up a resource. The developer sets up a dialog resource (DLOG) and a dialog items resource (DITL) as described above. The DLOG source code is shown below:

DLOG

Copyright Apple Computer, Inc. 1994

```
#include "Types.r"
/* This is the dialog displayed by IDOTest */
resource 'DLOG' (128) {
    {100, 100, 210, 360},
    dBoxProc,
    visible,
    noGoAway,
    0,
    128,            //indicates we our items are in DITL 128
    ""
};
```

The above resource shows that the dialog box's dimensions are given by the following four values (100, 100, 210, 360). Window definition ID is dBoxProc which means that this is a modal dialog box. The dialog box is visible and no close box will be drawn. The item list ID points to DITL 128.

Below is the source code representation of DITL 128.

DITL

Copyright Apple Computer, Inc. 1994

```
/* This is a list of the items in the dialog */
resource 'DITL' (128) {
    {
        {10, 100, 25, 155},
        StaticText {
            enabled,
            "IDO Test"
        },
        {30, 30, 45, 130},
        StaticText {
            enabled,
            "GroupingRect"
        },
        /* Here's the new IDO dialog item.
         * note that we only have to specify
         * the name of the IDO - in this
         * case we have a Grouping Rectangle. */
        {30, 140, 45, 250},
        IDOItem {
            enabled,
            "GroupingRect"
        },
        {75, 105, 95, 155},
        Button {
            enabled,
            "Quit"
        }
    }
};
```

In the DITL there are four items listed. The first item is StaticText at the size and location indicated by the four values (10, 100, 25, 155). The StaticText is to be put into the dialog is "IDO Test".

The second item is also StaticText at the size and location defined by the four values (30, 30, 45, 130). The text to be displayed is "GroupingRect".

The third item is an IDO dialog item. The size and location are defined by the four values (30, 140, 45, 250). The item type is specified to be an IDO item and the name of the IDO class is GroupingRect.

The fourth item is a button. It's location and size are defined by the values (75, 105, 95, 155). Included with the button is the text "Quit".

The Dialog Manager uses the name of the IDO class to find the IDO class. After locating the IDO class, the Dialog Manager stores a pointer to the IDO class in the handle field (see FIG. 8, reference # 246). Additionally, note how the format of an IDO in a DITL is slightly different than the format for a predefined item. Each predefined item has its own format known by the Dialog Manager. It is contemplated that in one embodiment all predefined items are eliminated and only IDO's exist. In the preferred embodiment, predefined items are not eliminated in order to be compatible with existing software.

Note that all the customization is done in the class definition. The resource has a pointer to the class. The application source code does not include any reference to the class. The application source code merely instructs that a dialog box is to be used. The resource only knows that a dialog box is to be set up with an IDO named GroupingRect. GroupingRect can be changed any time without requiring compiling of the application source code or resource or any of its subclasses. Thus, the class which is the definition of the item is set up separately from the application. Editing and compiling the class will not require a revision of the application, operating system or Dialog Manager. The developer setting up the GroupingRect does not need to know anything about the application. Furthermore, the developer of GroupingRect does not need to know very much about the Dialog Manager or even the details of the implementation of all the methods in the superclasses.

VII. Operation of Dialog Manager

Figure 12:
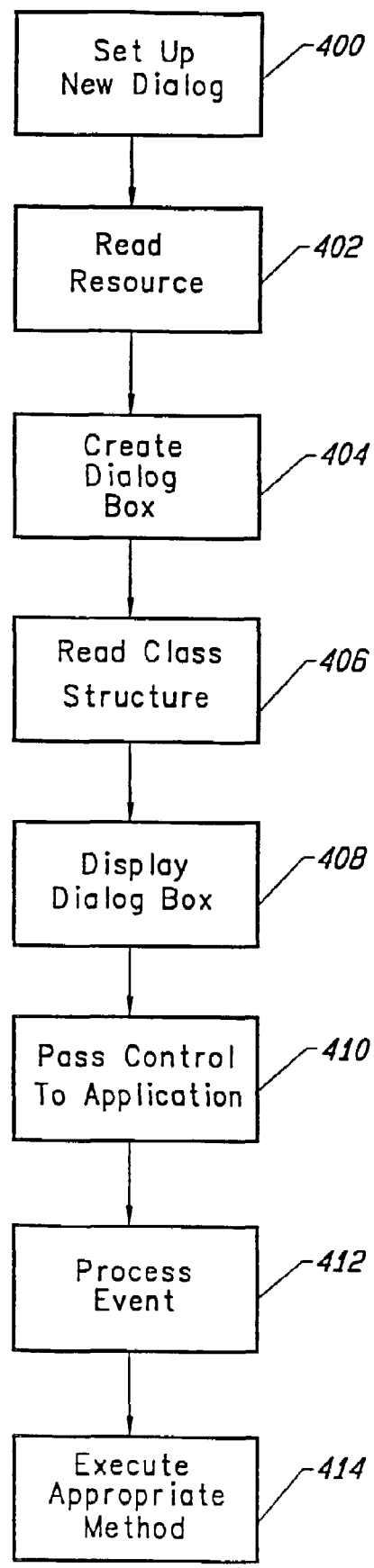
FIG. 12 is a flow chart explaining how the Dialog Manager manipulates an IDO.

FIG. 12 shows a flow chart of how the Dialog Manager works with an IDO. First, the given application will have an instruction to set up a dialog. Thus, in step 400 the Dialog Manager will begin setting up the new dialog. The first step is to read the resource of the application (402). When reading the resource, the Dialog Manager will first read the DLOG resource which will point to a DITL resource. Reading the DITL, the Dialog Manager will see all the different items. The Dialog Manager then creates the dialog box (404). If there is an IDO item in the DITL, the IDO item will include a reference to a class. The Dialog Manager will read the appropriate class and store the handle in the DITL (406). After reading all the appropriate classes, the dialog is displayed (408). Alternatively, the Dialog Manager may wait to create the dialog box until after the class is read.

Figure 13:
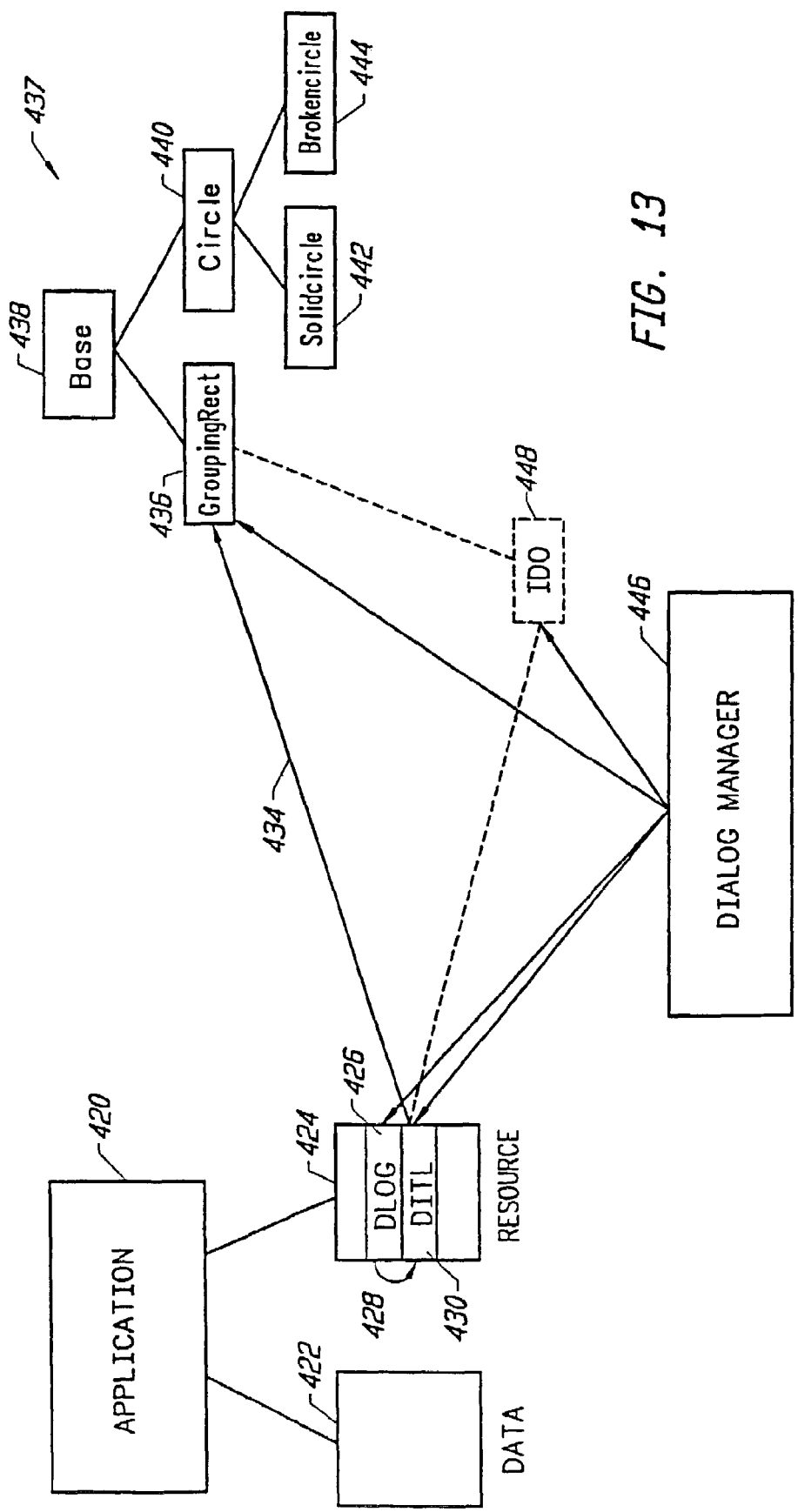
FIG. 13 is a symbolic representation of how an application, an IDO and the Dialog Manger interact.

After displaying the dialog box, the Dialog Manager gives control back to the application (410). When an event occurs that is relevant to the Dialog Manager, control is passed to the Dialog Manager for overseeing the processing of the event (412). In another embodiment, the Dialog Manager may receive the event itself, or may receive the event from the Event Manager or other Managers in the toolbox. Once receiving the event, the Dialog Manager or the other tool that sends the event must figure out what type of event it is and where the event occurred. Figuring out where the event occurred means figuring out what item did the event effect. If the event occurred to a dialog item that was created by an IDO, the Dialog Manager figures out which is the effected IDO. In step 414, the Dialog Manager causes the execution of the appropriate method. Note that the only method executed is the one that the Dialog Manager messages. FIG. 13 shows a symbolic representation which can aid in the explanation of the flow chart of FIG. 12.

FIG. 13 shows an application 420 with the data fork 422 and a resource 424. Resource 424 includes a DLOG 426 with a handle 428 pointing to a DITL 430. DITL 430 includes an item that is an IDO and, thus, there is a handle 434 pointing to the GroupingRect class 436. GroupingRect class 436 is part of a class hierarchy 437, which includes a base class 438. Base class 438 has two subclasses, GroupingRect 436 and Circle 440. Circle 440 has two subclasses, Solidcircle 442 and Brokencircle 444.

When setting up a resource, Dialog Manager 446 reads DLOG 426 which points the Dialog Manager to DITL 430. Since DITL 430 includes an item which is defined by an IDO, Dialog Manager 446 sets up handle. 434 to reference the GroupingRect class 436. Dialog Manager 446 then creates an IDO 448. IDO 448 is shown in broken lines because it represents an instance of GroupingRect class 446. Dialog Manager 446 uses the behavior defined in IDO 448 to manipulate the item. Manipulating an item, in the preferred embodiment, may include sending messages that call for the performance of any of the methods of the IDO.

Figure 14:
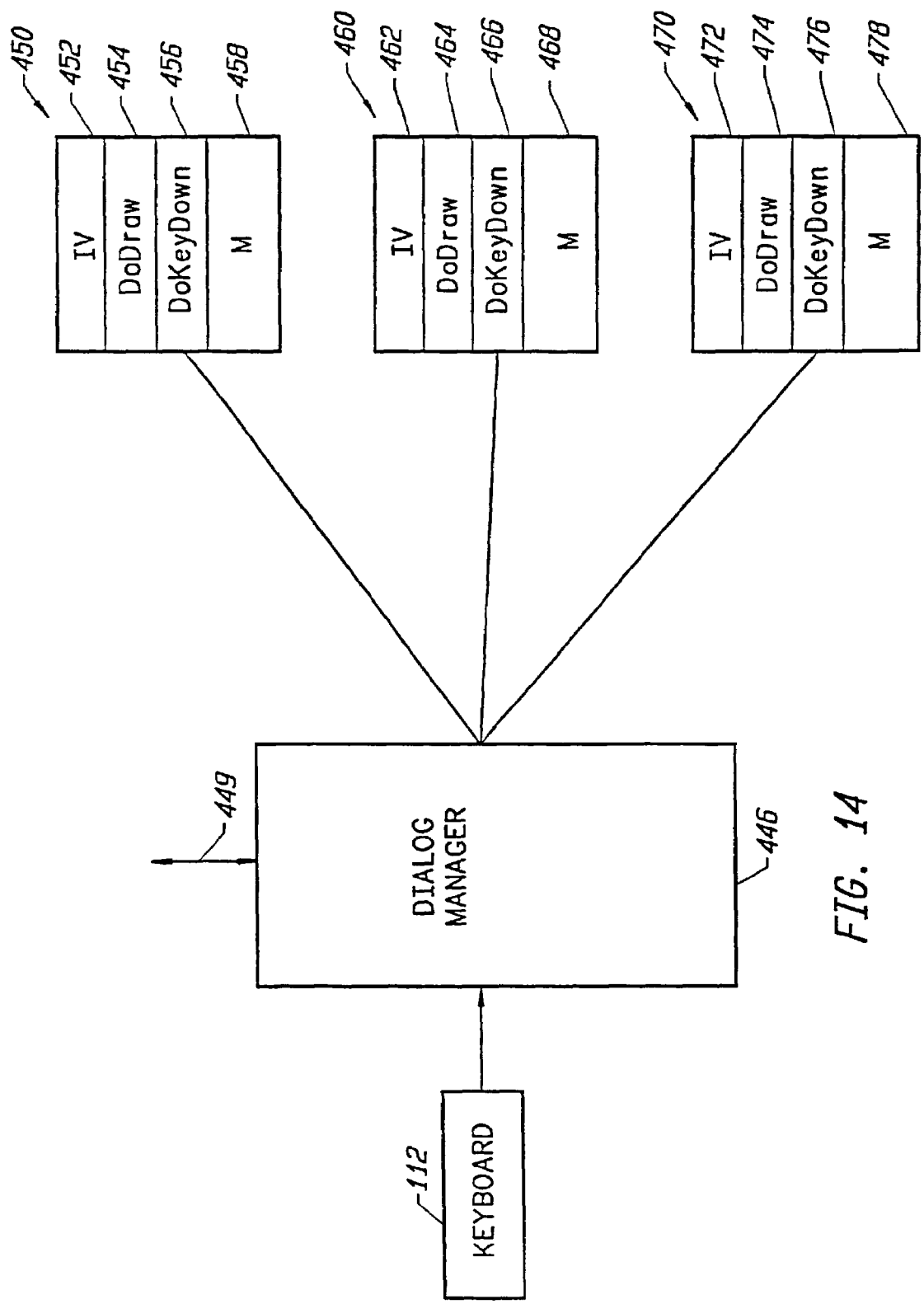
FIG. 14 is a symbolic representation of how the Dialog Manger process events pertaining to an IDO.

FIG. 14 shows a symbolic representation of how the Dialog Manager 446 deals with events. For illustration purposes, the event that occurs in this drawing is the user pressing one of the keys on the keyboard 112. Bidirectional arrow 449 indicates that the Dialog Manager processes events with the help of other tools in the toolbox. At one point, Dialog Manager 446 is idle (waiting for an event); for example, the application has control. The user presses the key on the keyboard 112 and triggers a KeyDown event. Control is passed to the Dialog Manager which figures out what item the KeyDown pertains to. In this particular dialog (fictitious dialog) there were three items defined by IDOs. The first item 450 includes instance variables 452, a DoDraw method 454, a DoKeyDown method 456 and other methods 458. Dialog item 460 includes instance variables 462, DoDraw method 464, DoKeyDown method 466 and other methods 468. Dialog item 470 includes instance variables 472, DoDraw method 474, DoKeyDown method 476 and other methods 478. As illustrated, each of the three items (450, 460, 470) each have a DoKeyDown method. Any or all of the three items (IDOs) could have inherited the DoKeyDown method from the superclass or could have overridden the DoKeyDown method from the superclass.

Once the Dialog Manager figures out that it is a DoKeyDown event and which item the event happened to, the Dialog Manager goes to the appropriate object and looks for the DoKeyDown method. That is, a message is sent to the object indicating the DoKeyDown method. In this instance if the key was depressed by the user while on top of the item defined by IDO 460, the Dialog Manager will message DoKeyDown method 466.

Figure 15:
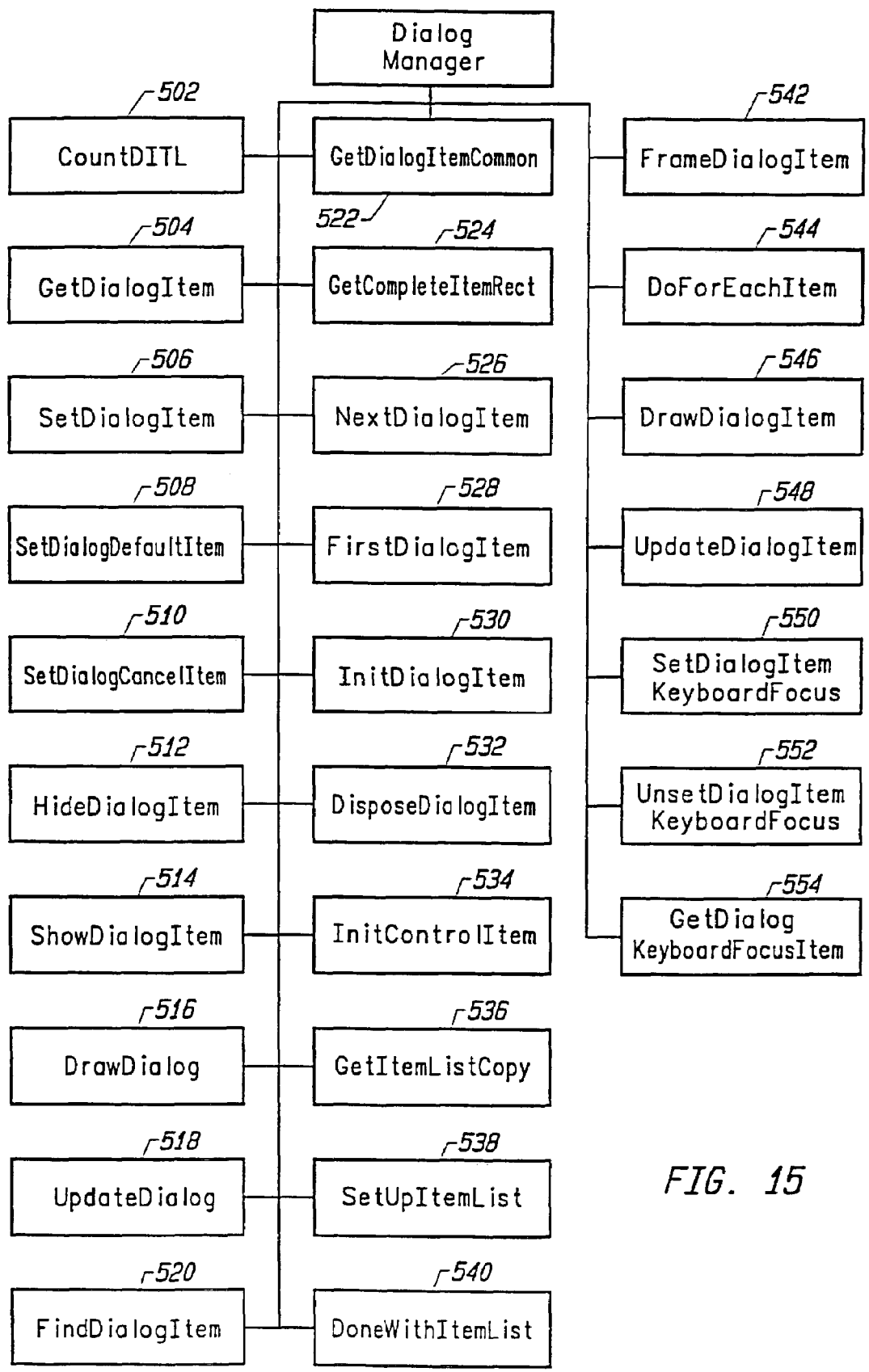
FIG. 15 is a block diagram showing the various routines carried out by the Dialog Manager.

The Dialog Manager performs all the tasks described with respect to FIGS. 11-13 while utilizing various routines. FIG. 15 shows the Dialog Manager and a symbolic representation of the routines that are pertinent to dialog items.

CountDITL 502 determines the number of items in a dialog item list. GetDialogitem 504 returns all pertinent information regarding an item. SetDialogItem 506 sets the given specifications for the dialog item at the given index in the item list. SetDialogDefaultItem 508 indicates which item in the give dialog box is the default choice. SetDialogCancelItem 510 indicates which item in the dialog box is a cancel button. For example, a dialog box may ask the user whether user wants all changes to be saved in a file and the choices may be "yes" or "cancel." HideDialogItem 512 hides a given dialog item in the given dialog. ShowDialogItem 514 shows the given dialog item in the given dialog. DrawDialog 516 draws each item in the dialog. UpdateDialog 518 draws each item in the dialog that lies within the given update region. The update region is the area on the screen where visual elements must be redrawn. FindDialogItem 520 returns the first dialog item whose rect encloses the given point. GetDialogItemCommon 522 is common code for getting a dialog item. This is called to get an individual DITL item. GetCompleteItemRect 524 returns the rect of the entire drawing area given a particular item. NextDialogItem 526 skips to the next dialog item ahead of the one passed to Dialog Manager. This function assumes that the Dialog Manager was passed a valid DITL item. FirstDialogItem 528 determines the first item in the dialog's item list. InitDialogItem 530 initializes the given dialog term as appropriate. DisposeDialogItem 532 disposes of the given dialog item. InitControlItem 534 initializes the given control dialog item. GetIteniLstCopy 536 gets a copy of the item list for the given DITL. SetupItemList 538 reloads the DITL resource if it was purged and locks it (cannot move around in memory). DoneWithItemList 540 is called when the Dialog Manager is done working with the DITL. The DITL is unlocked. FrameDialogItem 542 places a framed round rectangle around the dialog item. DoForEachItem 544 cycles through the item list (DITL) and applies the given function to each item. DrawDialogItem 546 draws a given dialog item in the given dialog. UpdateDialogItem 548 redraws a given dialog item if it is in the given update region. SetDialogItemKeyboardFocus 550 sets the keyboard focus on the given dialog item. UnsetDialogItemKeyboardFocus 552 unsets the keyboard focus on the given dialog item. GetDialogKeyboardFocusItem 554 returns the current keyboard focus item in the dialog. If none is focused, search for the first item in the DITL that can take a keyboard focus.

Below is pseudo-code for the routine DrawDialogItem:

DRAW DIALOG ITEM

```
DrawDialogItem (DialogItem theItem, Dialog theDialog)
{
    if (IsControlItem (theItem))
        call control manager routines draw the item's control
    else if (IsTextItem (theItem))
        call text routines to draw the item's text
    else if (IsPictureItem (theItem))
        call QuickDraw to draw the item's picture
    else if (IsIconItem (the Item))
        call Icon Utilities to draw the item's icon
    else if (IsIDOItem (theItem))
        dispatch to that item's DoDraw method
```

VIII. Editing A Dialog Item

Editing a dialog item is defined as changing the data that defines the item's state; for example, change static text, position coordinates, fonts, colors, etc. Dialog items can be edited in at least two different ways. First, create a resource using source code as shown in the code representing the resource for the GroupingRect shown above. The dialog box can be edited by using the Text Editor to edit the source code and then recompiling the source code. The source code for the dialog item and all other resources is independent from the source code for the application.

A second method for editing dialogs includes creating and editing resources with an interactive graphics-oriented resource editor; for example, ResEdit™ by Apple Computer. A more detailed description of ResEdit™ can be found in "ResEdit™ Reference For ResEdit version 2.1," 1991, Addison-Wesley Publishing Company, incorporated herein by reference.

ResEdit™ is an application that can read a resource, and then provide the user with a dialog window presenting the data inside the resource. Using the dialog window, the user can edit the data in the resource.

Figure 16:
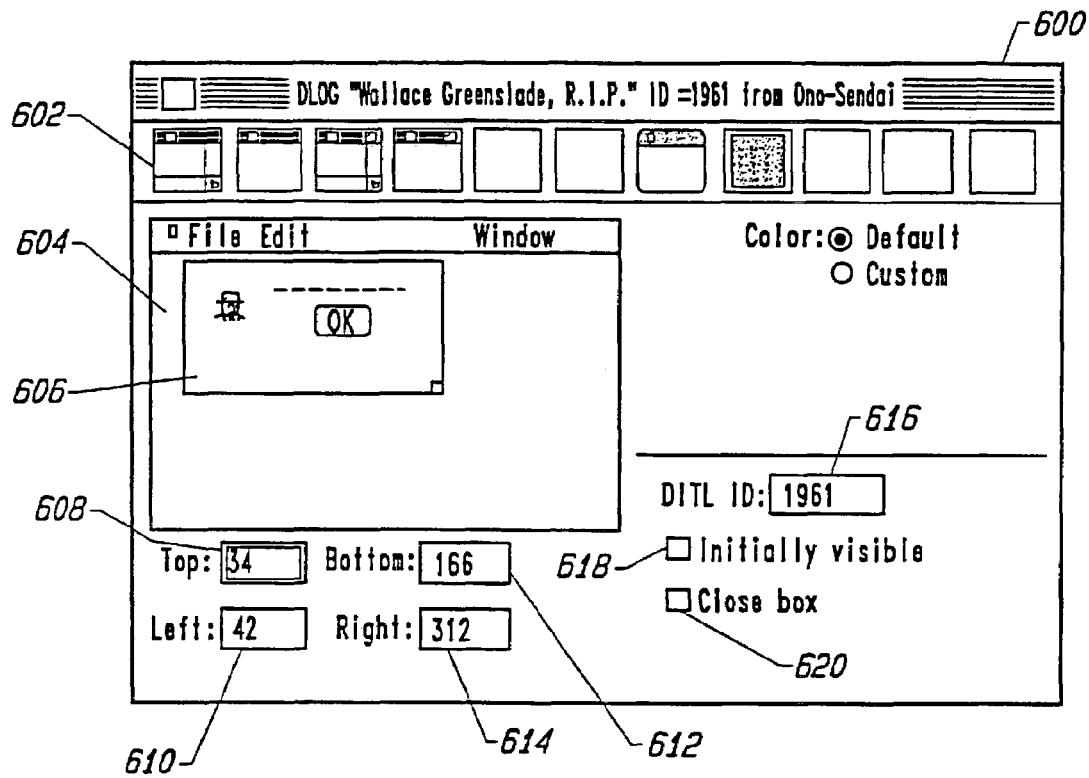
FIG. 16 shows the DLOG Resource Editor.
Figure 17:
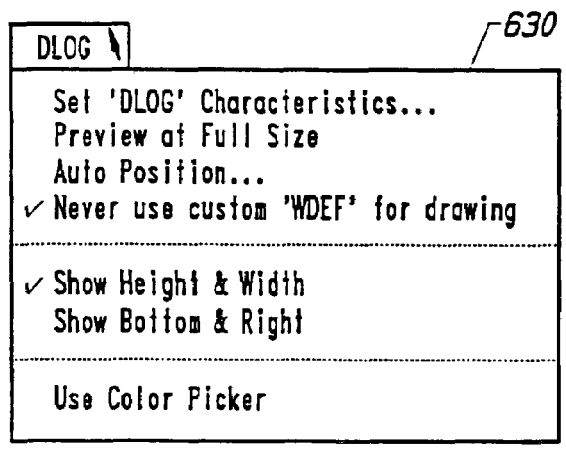
FIG. 17 shows the DLOG Menu.

When editing a DLOG resource, ResEdit™ will display a window or dialog box 600 shown in FIG. 16. At the top of window 600 is a pictorial list 602 of the selectable window styles for the dialog box. Below that is a miniscreen 604 that shows a small picture 606 of the dialog box. Coordinates top 608, left 610, bottom 612, right 614 correspond to rectangle 202 in the dialog resource shown in FIG. 6. DITL ID 616 corresponds to item list ID 216 in dialog resource 200 of FIG. 6. Visible 618 corresponds to visibility 206 in dialog resource 200 of FIG. 6. Close box 620 corresponds to close box 210 in dialog resource 290 of FIG. 6.

When a DLOG resource is displayed in ResEdit™ a corresponding menu appears. This menu 630 is shown in FIG.

Figure 18:
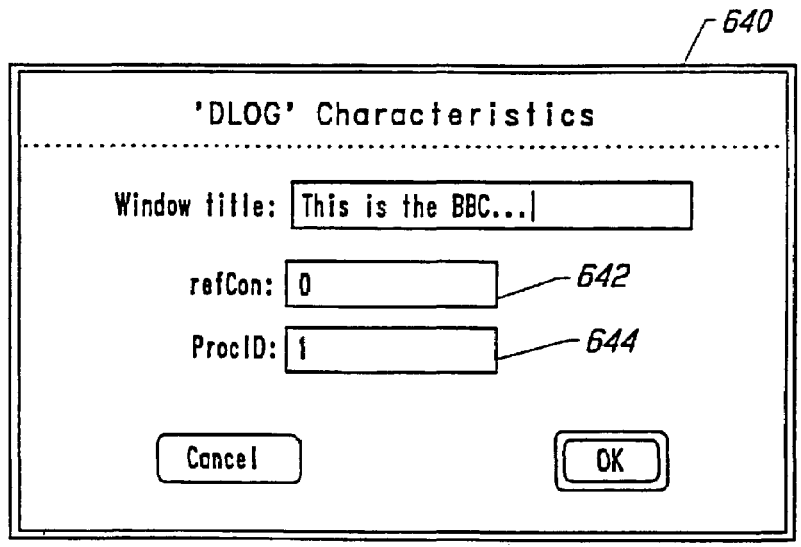
FIG. 18 shows a window for setting the DLOG characteristics.

17. "Set 'DLOG' characteristics" brings up a dialog box 640 shown in FIG. 18, which allows the user to title the window and set its refCon 642 and procID 644. If the procID 644 is not associated with any of the pictures at the top of the main window, none of those pictures are selected.

"Preview at Full Size" displays the resource size as its normal display.

"Autoposition" allows the system to position a window automatically when it is drawn.

"Never Use Custom 'WDEF' for Drawing" when true (default) causes the resource to be drawn with the standard 'WDEF' resource from the system file regardless of the value assigned to the procID.

"Show Height & With" changes the editable fields (top, bottom, left, right) at the bottom of the window to show relative size position information.

"Show Bottom & Right" changes the editable fields (left, right) at the bottom of the window to show absolute size/position information.

"Use Color Picker" lets the user use an automatic color picker to set the colors of the various parts of the resource. The color picker is optional and is not necessary.

Figure 19:
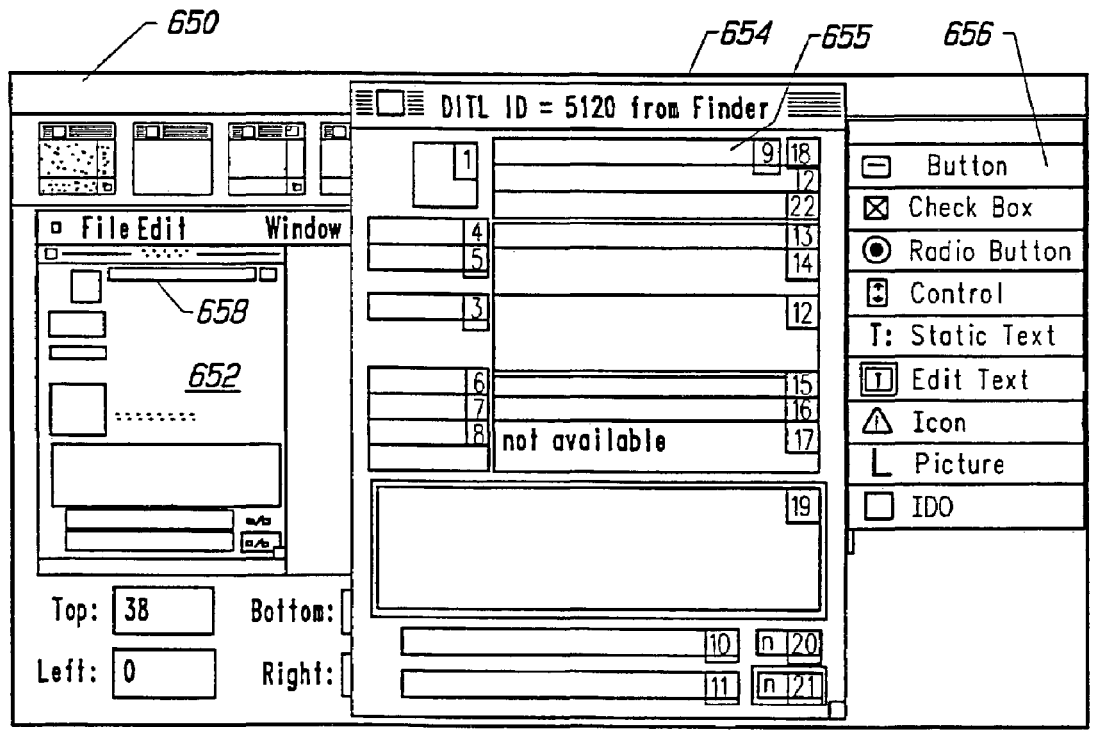
FIG. 19 shows the DITL Editor.

When a user is interacting with window 600, shown in FIG. 16, the user can open up the DITL resource editor by double clicking on the picture 652 of the dialog box in the DLOG resource editor. Alternatively, the DITL resource editor can be invoked directly. When the DITL resource editor 654 (FIG. 19) is invoked, it displays an image of the items from the list just as they are displayed in a dialog box, e.g., 650. When an item is selected a dotted rectangle is drawn around it. The rectangle has a size box in its lower right corner so you can change the size of the rectangle. The DITL editor uses the Dialog Manager to display the DITL resources. This ensures that the items look the same when the application displays them as they do in ResEdit™. To create a new item, the user drags the type that the user wants from the item palate 656. To edit an existing item, the user double clicks on the item or select the item and press the return key. When an item is selected, ResEdit™ sets up the item editor shown as 660 in FIG. 20. In the case of the item editor 660, the user double clicked on item 9 shown in the DITL resource editor as reference 655 and shown in the DLOG picture as reference 658. Item 9 is StaticText.

When the user double clicks on any of the items, an item editor is set up for that item. Each type of item has its own item editor. That is, there is a button item editor, a check box item editor, a radio button editor, etc. This is so because button, check box and radio button are predefined items and ResEdit™ can be programmed to edit those items. However, if the item is an IDO, ResEdit™ will not know the structure, behavior or definition of the IDO. Therefore, ResEdit™ will not have item editor for an IDO. Thus, each IDO must have its own editor embedded inside the IDO. This will be discussed below.

Figure 20:
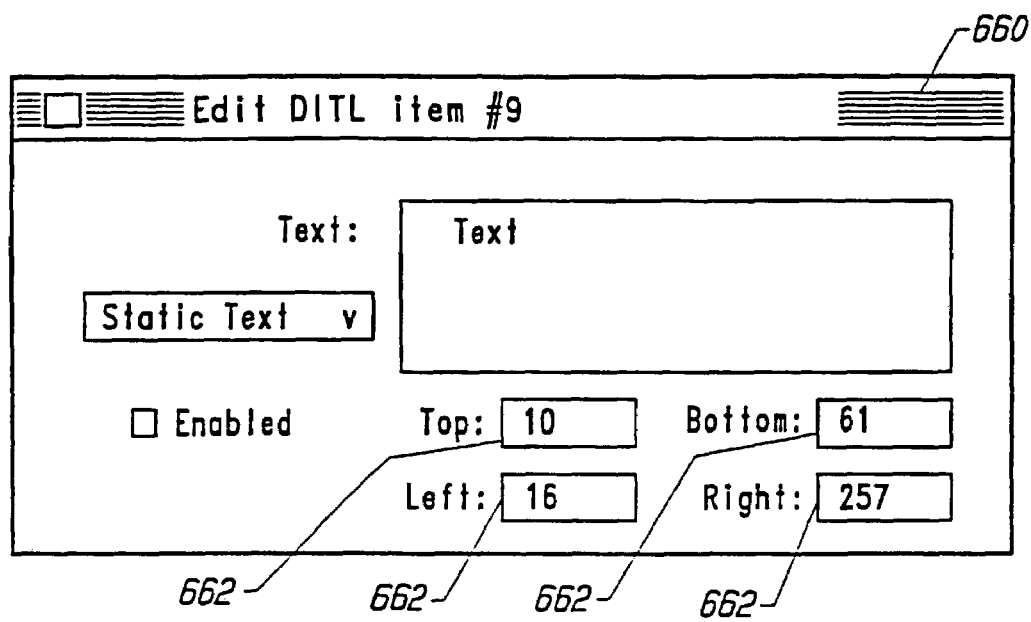
FIG. 20 shows the DITL Item Editor.
Figure 21:
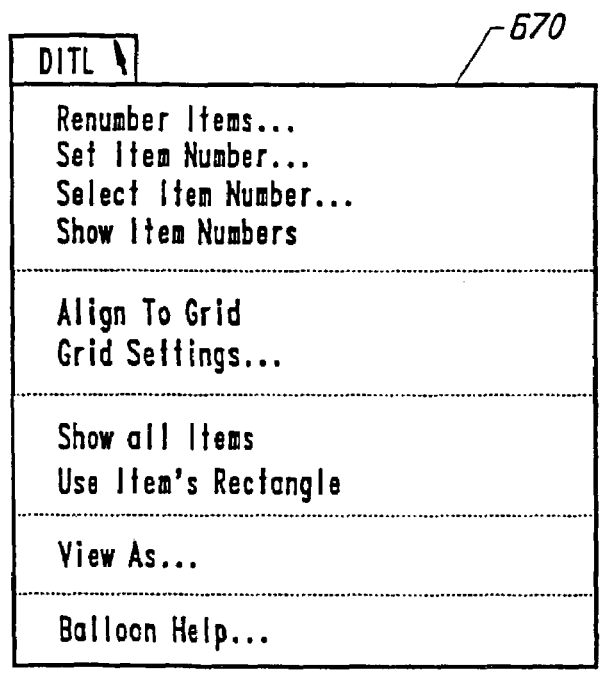
FIG. 21 shows the DITL menu.

Looking at FIG. 20, the user can edit the rectangle values by manipulating the numbers in boxes 662. Additionally, the text can be edited by moving the cursor into box 664, and with the keyboard, typing new text. When using the DITL resource editor 654 of FIG. 19, the user has a DITL menu, shown in FIG. 21. The DITL menu 670, contains the following commands:

"Renumber Items" allows a user to reorder items in the 'DITL' resource.

"Set Item Number . . . " allows a user to specify a new number for a selected item. Some of the items may need to be renumbered.

"Select Item Number . . . " allows a user to select an item by specifying its number. This is useful for items that are obscured by other items or are outside the window. Once an item is selected, it can be opened by pressing the Return key.

"Show Item Numbers" sets the display to show the number of each item in the 'DITL' resource.

"Align To Grid" aligns the items on an invisible grid, the size of which defaults to 10 by 10 pixels. If the location of the item is changed while Align To Grid is on, the location is adjusted such that the upper-left corner lies on the grid point nearest to the location given. If an item's size is changed, it is constrained to be a multiple of the current grid setting in each dimension.

"Grid Settings . . . " allows for the setting of the horizontal and vertical grid sizes. These both default to 10 pixels.

"Show All Items" adjusts the window size so that all items in the item list are visible in the window (or makes the window as large as the current screen size allows, if the screen is smaller). This command is present solely for convenience when editing the dialog items.

"View As . . . " brings up a dialog box, that allows the setting of the typeface and size in which Edit Text and Static Text items are displayed in the editor. This command does not actually change the resource itself. It is useful if a user is designing a dialog box that is to be displayed using a different font from the default font of the editor, which is 12-point Chicago.

"Balloon Help . . . " brings up a dialog box with items that relate to Balloon Help in the system software.

In regard to editing an IDO, the problem is that ResEdit™ will not know the structure of an IDO. Thus, the ResEdit™ will not know how to edit an IDO. The solution is that the IDOs must include methods that tell ResEdit™ how to edit the IDO. For example, one of those methods is EditStaticData. Below is a pseudocode for the method EditStaticData.

EDIT STATIC DATA

```
void GroupingRect::EditStaticData (void)
{
    create a dialog to find out what the title should be (702)
    wait until the user is done with the dialog (704)
    if the user selected "ok" { (706)
        get the title that the user entered
        set my title property to be that title (708)
    }
    otherwise, the user selected cancel. Don't
    bother changing the title. (710)
}
```

Figure 22:
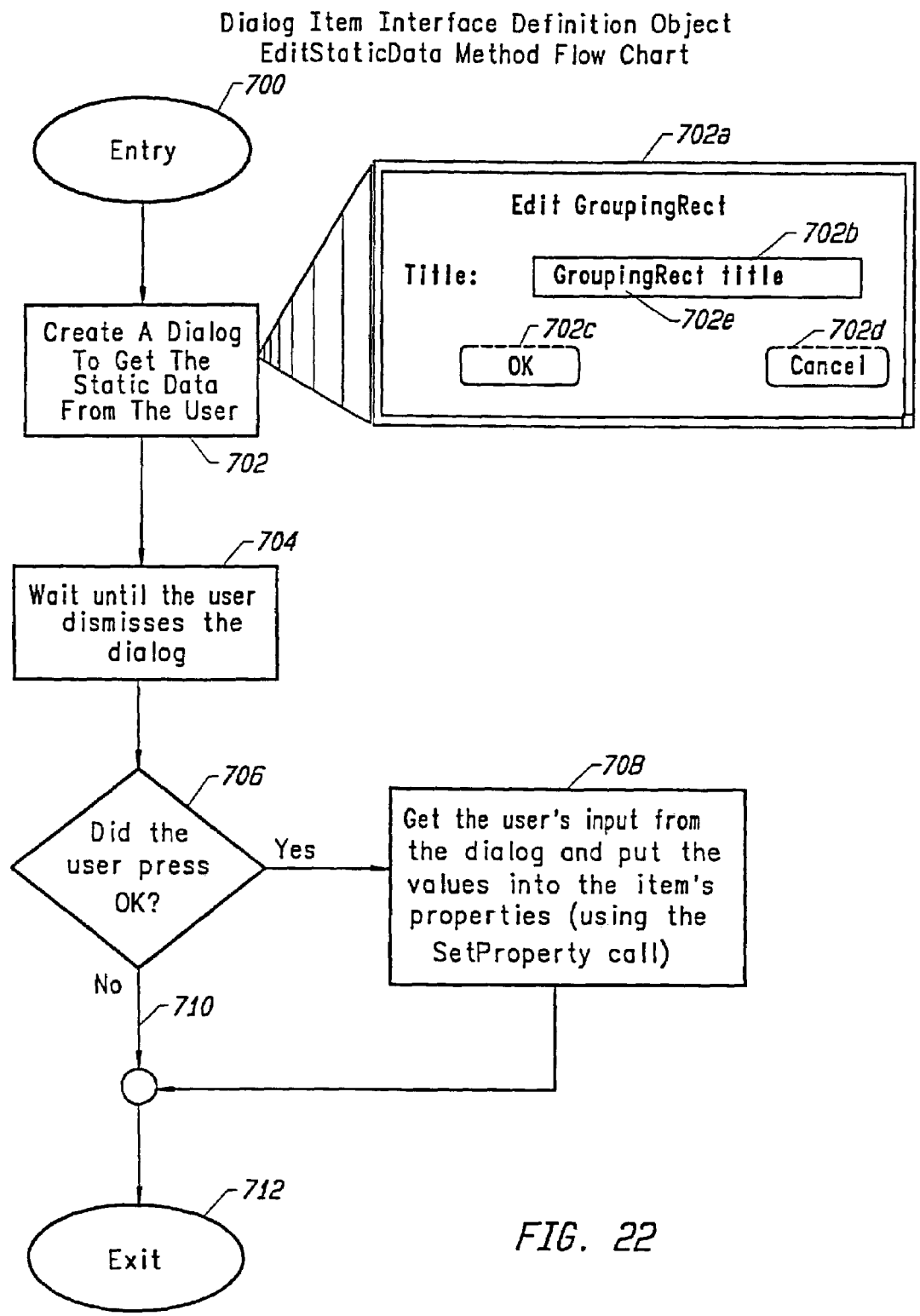
FIG. 22 is a flow chart of the method for editing an IDO.

After the various lines of pseudocode, there is a number included in parenthesis. This number corresponds to the step in the flow chart of FIG. 22. The first step of the method is to create a dialog to get the Static Data from the user (700). The method then creates (702) a dialog box 702*a*, which shows a rectangle 702*b* and has a predefined text string 702*e* in the rectangle 702*b*. At that point, the user can erase text 702*e* and type in new text. When the user is done entering information, the user can choose one of two buttons: OK button 702*c* or the cancel button 702*d*. By pushing either of the two buttons, the user is dismissing (704) the dialog box. If the user pressed cancel (710), the edits by the user will not be saved. If the user pressed OK (706), the user's inputs are stored (708). The next time the item is called, the text inputted by the user will show up in the dialog box. Finally the method is finished (712).

All the instructions for doing these edits will be found in the EditStaticData method. If ResEdit™ attempts to edit an IDO, ResEdit™ will see that it is an IDO and pass control to the proper method. Other methods would be used to edit other aspects of various items. One skilled in the art will be able to use the description above to create other types of edit methods.

Thee foregoing description of a preferred embodiment of the invention has been presented for purposes of illustration and description. It is not intended to be exhaustive or to limit the invention to the precise form disclosed, and obviously many modifications and variations are possible in light of the above teaching. The preferred embodiment was chosen and described in order to best explain the principles of the invention and its practical application to thereby enable others skilled in the art to best utilize the invention in various embodiments and with various modifications as are suited to particular use contemplated. It is intended that the scope of the invention be defined by the claims appended hereto.

APPENDIX A

Copyright Apple Computer, Inc. 1994

```
#define DialogItemDefinitionObject_Class_Source
#include <Drag.h>
#include <Errors.h>
#include <Resources.h>
include <Dialogs.h> include "DialogItemDefinitionObject.ih"

/*
##################################################################
```

Initialize

| | |
|---|---|
| FUNCTION: | Sets the IDO's data handle and its other fields at initialization time. |
| INPUTS: | itsDialog: the IDO's owning dialog |
| | itsIndex: the IDO's index in its dialog's item list |
| | itsRect: the IDO's bounding rect |
| | theData: the IDO's data (to be defined by subclasses.) |
| OUTPUTS: | none |

Attorney Docket No.: APPL1328MCF/WSW/BBM
bbm/appl/1328.001

```
  RETURNS:    void
*/
SOM_Scope void SOMLINK Initialize(DialogItemDefinitionObject *somSelf,
Environment *ev)
{
    DialogItemDefinitionObjectData *somThis =
DialogItemDefinitionObjectGetData(somSelf);

/* assume that we don't want idle time. It's the subclass's
responsibility
            * to reset _fIdleTimeWaitPeriod if it wants idle time. */
        _fIdleTimeWaitPeriod = -1;
}

/*
######################################################################
```

EditStaticData

FUNCTION: Method called to allow easier manipulation of an IDO at creation time, so IDO editors (like future versions of ResEdit) can edit any IDO without knowing its characteristics.
Any static data for an IDO item should be stored in properties (using the SetProperty utility routine) This method is never called by the dialog manager itself.

```
INPUTS:     none
OUTPUTS:    none
RETURNS:    void
*/
SOM_Scope void SOMLINK EditStaticData(DialogItemDefinitionObject *somSelf,
Environment *ev)
{
    DialogItemDefinitionObjectData *somThis =
DialogItemDefinitionObjectGetData(somSelf);

}

/*
######################################################################
```

Dispose

```
FUNCTION:   Dispose the IDO's dynamically allocated data
INPUTS:     none
OUTPUTS:    none
RETURNS:    void
*/
SOM_Scope void SOMLINK Dispose(DialogItemDefinitionObject *somSelf,
Environment *ev)
{
    DialogItemDefinitionObjectData *somThis =
```

-53-

DialogItemDefinitionObjectGetData(somSelf);

}

/*
##############################################################

DoDraw

FUNCTION: Draw the IDO. Assumes that the port has been set to the IDO's dialog, and that the port's state is being preserved.
INPUTS:    none
OUTPUTS:   none
RETURNS:   void
*/
SOM_Scope void SOMLINK DoDraw(DialogItemDefinitionObject *somSelf, Environment *ev)
{
    DialogItemDefinitionObjectData *somThis = DialogItemDefinitionObjectGetData(somSelf);

}

/*
##############################################################

DoIdle

FUNCTION: Do whatever is necessary at idle time. This is only called if the fNeedsIdleTime field was set when SetData was called.
INPUTS:    none
OUTPUTS:   none
RETURNS:   void
*/
SOM_Scope void SOMLINK DoIdle(DialogItemDefinitionObject *somSelf, Environment *ev)
{
    DialogItemDefinitionObjectData *somThis = DialogItemDefinitionObjectGetData(somSelf);

}

/*
##############################################################

DoActivate

FUNCTION: Activate or DeActivate the IDO.
INPUTS:    isActive: true if we are activating, false if we are deactivating

```
OUTPUTS:    none
RETURNS:    void
*/
SOM_Scope void  SOMLINK DoActivate(DialogItemDefinitionObject *somSelf,
Environment *ev,
                boolean isActive)
{
    DialogItemDefinitionObjectData *somThis =
DialogItemDefinitionObjectGetData(somSelf);

}

/*
##############################################################

CursorEnteredRect

FUNCTION:   adjust the cursor as it has just entered this item's bounds
rect.
    INPUTS:     none
    OUTPUTS:    none
    RETURNS:    void
*/
SOM_Scope void  SOMLINK CursorEnteredRect(DialogItemDefinitionObject
*somSelf, Environment *ev)
{
    DialogItemDefinitionObjectData *somThis =
DialogItemDefinitionObjectGetData(somSelf);

/* by default, IDO's have the arrow cursor */
        InitCursor ();
}

/*
##############################################################

SetKeyboardFocus

FUNCTION:   when the user has tabbed into or clicked into a new item, this method is
called to allow the item to visually show its keyboard focus.
    INPUTS:     isFocus: if true, then we are setting keyboard focus to this item;
otherwise, focus is being removed from this item and
it should be redrawn normally.
    OUTPUTS:
    RETURNS:
*/
SOM_Scope void  SOMLINK SetKeyboardFocus(DialogItemDefinitionObject
*somSelf, Environment *ev,
                boolean isFocus)
{
    DialogItemDefinitionObjectData *somThis =
```

DialogItemDefinitionObjectGetData(somSelf);

}

/*
##########################################################

DoMouseDown

FUNCTION:   the user has just clicked inside this IDO. react to the MouseDown event as necessary.
INPUTS:     theEvent: the MouseDown event that indicates the click in this IDO
OUTPUTS:    none
RETURNS:    true if we want to return this item's index to the app (through
            dialog select or ModalDialog)
*/
SOM_Scope boolean SOMLINK DoMouseDown(DialogItemDefinitionObject *somSelf, Environment *ev,
            EventRecord* theEvent)
{
    DialogItemDefinitionObjectData *somThis = DialogItemDefinitionObjectGetData(somSelf);

/* Return statement to be customized: */
    return;
}

/*
##########################################################

DoKeyDown

FUNCTION:   The user has just pressed a key and this is the dialog's keyboard focus item. react to the keystroke as necessary.
INPUTS:     theEvent: the KeyDown event that indicates the keystroke in this IDO
OUTPUTS:    none
RETURNS:    true if we want to return this item's index to the app (through
            dialog select or ModalDialog)
*/
SOM_Scope boolean SOMLINK DoKeyDown(DialogItemDefinitionObject *somSelf, Environment *ev,
            EventRecord* theEvent)
{
    DialogItemDefinitionObjectData *somThis = DialogItemDefinitionObjectGetData(somSelf);

/* Return statement to be customized: */
    return;

}

/*
#############################################################

SimulateClick

FUNCTION: simulate the selection of this item (eg, when the equivalent shortcut
key is pressed)
INPUTS: none
OUTPUTS: none
RETURNS: void

*/
SOM_Scope void SOMLINK SimulateClick(DialogItemDefinitionObject
*somSelf, Environment *ev)
{
    DialogItemDefinitionObjectData *somThis =
DialogItemDefinitionObjectGetData(somSelf);

}

/*
#############################################################

DragEnteredItem

FUNCTION: React to a drag entering this item's rect
INPUTS: theDrag: the drag that has entered this item
OUTPUTS: none
RETURNS: true if this item can accept the given drag.
*/
SOM_Scope boolean SOMLINK DragEnteredItem(DialogItemDefinitionObject
*somSelf, Environment *ev,
            DragReference theDrag)
{
    DialogItemDefinitionObjectData *somThis =
DialogItemDefinitionObjectGetData(somSelf);

return false;
}

/*
#############################################################

DragInItem

FUNCTION: continue to track drag in this item's rect
INPUTS: theDrag: the drag that has entered this item

```
OUTPUTS:    none
RETURNS:    void
*/
SOM_Scope void  SOMLINK DragInItem(DialogItemDefinitionObject *somSelf,
Environment *ev,
                DragReference theDrag)
{
    DialogItemDefinitionObjectData *somThis =
DialogItemDefinitionObjectGetData(somSelf);

}

/*
##################################################################

DragLeftItem

FUNCTION:   React to a drag leaving this item's rect
INPUTS:     theDrag: the drag that has entered this item
OUTPUTS:    none
RETURNS:    void
*/
SOM_Scope void  SOMLINK DragLeftItem(DialogItemDefinitionObject
*somSelf, Environment *ev,
                DragReference theDrag)
{
    DialogItemDefinitionObjectData *somThis =
DialogItemDefinitionObjectGetData(somSelf);

}

/*
##################################################################

DropInItem

FUNCTION:   React to a drag manager reception in this item's rect
INPUTS:     theDrag: the drag that has entered this item
OUTPUTS:    none
RETURNS:    OSErr as appropriate.
*/
SOM_Scope OSErr  SOMLINK DropInItem(DialogItemDefinitionObject
*somSelf, Environment *ev,
                DragReference theDrag)
{
    DialogItemDefinitionObjectData *somThis =
DialogItemDefinitionObjectGetData(somSelf);

return dragNotAcceptedErr;
}
```

Attorney Docket No.: APPL1328MCF/WSW/BBM
bbm/appl/1328.001

```
/*
##################################################################

GetProperty

FUNCTION:    Get a property associated with this item
     INPUTS:      propertyType: the type of property we're looking for
                       propertySize: expected size of the property's data
     OUTPUTS:     propertyData: the property's data
                       actualPropertySize: the actual size of the property's data
     RETURNS:     OSErr as appropriate.
*/
SOM_Scope OSErr  SOMLINK GetProperty(DialogItemDefinitionObject
*somSelf, Environment *ev,
                OSType propertyType,
                void* propertyData,
                unsigned long propertySize,
                unsigned long* actualPropertySize)
{
    DialogItemDefinitionObjectData *somThis =
DialogItemDefinitionObjectGetData(somSelf);

/* simply call through to the dialog manager's property managerment
routines */
        return GetDialogItemProperty (_fDialog, _fIndex, propertyType,
                    propertyData, propertySize, actualPropertySize);
}

/*
##################################################################

SetProperty

FUNCTION:    Set a property associated with this item
     INPUTS:      propertyType: the type of property we're looking for
                       propertySize: size of the property's data
                       propertyData: the property's data
     OUTPUTS:     none.
     RETURNS:     OSErr as appropriate.
*/
SOM_Scope OSErr  SOMLINK SetProperty(DialogItemDefinitionObject
*somSelf, Environment *ev,
                OSType propertyType,
                void* propertyData,
                unsigned long propertySize)

{
    DialogItemDefinitionObjectData *somThis =
DialogItemDefinitionObjectGetData(somSelf);

/* simply call through to the dialog manager's property managerment
```

-59-

```
routines */
        return SetDialogItemProperty (_fDialog, _fIndex, propertyType,
                        propertyData, propertySize);
}

/*
#############################################################

GetResourceFromMyChain

FUNCTION:   Just like toolbox GetResource, but sets up the resource chain
                such that this IDO can have its own associated resources.
INPUTS:     resType: type of the desired resource
                resID: ID of the desired resource
OUTPUTS:    none
RETURNS:    The resource or NULL if we had an error.  (Check ResError()
for details)
*/
SOM_Scope Handle SOMLINK
GetResourceFromMyChain(DialogItemDefinitionObject *somSelf, Environment *ev,
                OSType resType,
                short resID)
{
    DialogItemDefinitionObjectData *somThis =
DialogItemDefinitionObjectGetData(somSelf);
        Handle theResource;

/* Set up the resource chain such that the ido's file is in it */

/* now, get the resource */
    theResource = GetResource (resType, resID);

/* restore the resource chain */ return theResource;
}
```

APPENDIX B

Copyright Apple Computer, Inc. 1994

```
#include <Memory.h>
#include <Dialogs.h>
#include <OSUtils.h>
#include <Resources.h>
#include <Memory.h>
```

Attorney Docket No.: APPL1328MCF/WSW/BBM

```
#include <LowMem.h>
#include <Exceptions.h>
#include <Quickdraw.h>
include <ToolUtils.h> include <LowMemPriv.h>
include <DialogsPriv.h>
include <MixedModePriv.h> include "DialogsAllocate.h"
include "DialogItems.h"
#include "DialogsInternal.h"
#include "DialogsText.h"
#include "DialogsAuxInfo.h"
#include "DialogAccessors.h"
#include "DialogIDOs.h"
#include "DialogEvents.h"

/*
########################################################################

_CountDITL

FUNCTION:   detrermines the number of items in the dialog item list
INPUTS:     theDialog: the dialog we're working with
OUTPUTS:    none
RETURNS:    number of items in the item list
*/ pascal DialogItemIndex1 __CountDITL (DialogRef theDialog)
{
        DITLHeaderPtr   theDITL;
        Handle          itemList;
        DialogPeek      realDialog = (DialogPeek) theDialog;

require (realDialog != NULL, NULLDialog);
        require (realDialog->items != NULL, NULLItemList);

/* get the item list handle. If it has been purged, recover it */
        itemList = realDialog->items;

if (*itemList == NULL) {
            LoadResource (itemList);

require (ResError() == noErr, ResourceError);
        }

/* get the DITL to count the number of items, and return that number
         * (converted to 1-based) */
```

Attorney Docket No.: APPL1328MCF/WSW/BBM
bbm/appl/1328.001

```
        theDITL = (DITLHeaderPtr) *itemList;
        return theDITL->numItems + 1;

/* we get here if a problem was encountered trying to count the items.
         * return 0 as an error value */
ResourceError:
NULLItemList:
NULLDialog:
        return 0;
}

/*
##################################################################

__GetDialogItem

FUNCTION:   given a dialog and an item index, return al pertinent
                information regarding the item at that index
    INPUTS:     theDialog: the dialog we're working with
                itemNum: index of the item we want to find (1-based)
    OUTPUTS:    itemType: the item's type
                itemData: a handle to the item's data (NULL if we can't find
                          an item at the given index)
                itemRect: the item's bounding rectangle
    RETURNS:    void.
*/
pascal void __GetDialogItem (DialogRef theDialog, DialogItemIndex1 itemNum,
        DialogItemType *itemType, Handle *itemData, Rect *itemRect)
{
        DITLItemPtr theItem;

/* make sure our DITL list is loaded and locked */
        SetupItemList ((DialogPeek) theDialog);

/* get the item from our item list. If it exists (ie, if
         * itemNum is a valid index) then set our output
         * variables accordingly */
        if (GetDialogItemCommon ((DialogPeek) theDialog, itemNum, &theItem)) {

/* jam the appropriate values into our outputs */
                *itemType = theItem->itemType & 0xFF;           // low byte only
                *itemData = theItem->itemHandle;
                *itemRect = theItem->itemRect;

}

/* if an invalid index, set itemData to NULL, indicating the
         * item doesn't exist */
```

```
                else
                        *itemData = NULL;

/* unlock the DITL list again */
        DoneWithItemList ((DialogPeek) theDialog);
}

/*
#############################################################

__SetDialogItem

FUNCTION:       set the given specifications for the dialog item
                at the given index in its item list.
INPUTS:         theDialog: the dialog we're working with
                        itemNum: index of the item we want to find (1-based)
                        itemType: the item's type
                        itemData: a handle to the item's data
                        itemRect: the item's bounding rectangle
OUTPUTS:        none.
RETURNS:        void.
*/
pascal void __SetDialogItem (DialogRef theDialog, DialogItemIndex1 itemNum,
        DialogItemType itemType, Handle itemData, const Rect *itemRect)
{
        DITLItemPtr theItem;

/* make sure our DITL list is loaded and locked */
        SetupItemList ((DialogPeek) theDialog);

/* get the item from our item list. If it exists (ie, if
         * itemNum is a valid index) then set the item's attributes
         * accordingly */
        if (GetDialogItemCommon ((DialogPeek) theDialog, itemNum, &theItem)) {

/* jam the appropriate values into our outputs */
                theItem->itemType = (SignedByte) (itemType & 0xFF);     // low byte only
                theItem->itemHandle = itemData;
                theItem->itemRect = *itemRect;
        }

/* unlock the DITL list again */
        DoneWithItemList ((DialogPeek) theDialog);
}

/*
#############################################################

__SetDialogDefaultItem
```

```
FUNCTION:   Indicate which item in the given dialog box is the default.
INPUTS:     theDialog: the dialog that owns this item
            itemNum: index of the default item (1-based)
OUTPUTS:    none
RETURNS:    noErr
*/
pascal OSErr _SetDialogDefaultItem (DialogRef theDialog,
DialogItemIndex1 itemIndex)
{
        DialogPeek realDialog = (DialogPeek) theDialog;
        AuxDialogHandle auxDialog = GetAuxDialog (realDialog);

DITLItemPtr    defaultItem;
        OSErr theError;

/* set the current default item */
        realDialog->dlgDefaultButtonItem = itemIndex;

/* get the default item and set its control attribute accordingly */
        if (GetDialogItemCommon (realDialog, itemIndex, &defaultItem) == false)
                return -1;

/* we should always have an auxDialog rec */
        check (auxDialog != NULL);

/* if this is a control and the control can draw itself in
         * "Default" mode, tell the control that it is default */
        if (IsControlItem (defaultItem)) {
                ControlRef theControl;

theControl = (ControlRef) defaultItem->itemHandle;

if (GetControlProperty (theControl,
kSupportsDrawingCallsControlProperty,
                        NULL, 0, NULL) == noErr) {
                        Boolean isDefault = true;

theError = SetControlProperty (theControl,
kIsKeyboardFocusControlProperty,
                                (void *) &isDefault, sizeof (isDefault));
                        require (theError != noErr, CouldNotSetProperty);

(**auxDialog).drawDefaultButton = true;
                }
                else
                        (**auxDialog).drawDefaultButton = false;
        }
        else
                (**auxDialog).drawDefaultButton = false;
```

```
        if (defaultItem == 0)
                (**auxDialog).handleDefaultButton = false;
        else
                (**auxDialog).handleDefaultButton = true;

return noErr;

CouldNotSetProperty:
        return theError;
}

/*
##############################################################

__SetDialogCancelItem
```

FUNCTION: Indicate which item in the given dialog box is the cancel button.
INPUTS:  theDialog: the dialog that owns this item
         itemNum: index of the default item (1-based)
OUTPUTS: none RETURNS: noErr

```
*/
pascal OSErr __SetDialogCancelItem (DialogRef theDialog,
DialogItemIndex1 cancelItem)
{
        DialogPeek realDialog = (DialogPeek) theDialog;
        AuxDialogHandle auxDialog = GetAuxDialog (realDialog);

/* set the current cancel item */
        realDialog->dlgCancelButtonItem = cancelItem;

/* we should always have an auxDialog rec */
        check (auxDialog != NULL);

/* remember whether or not we handle the default button */
        if (cancelItem == 0)
                (**auxDialog).handleCancelButton = false;
        else
                (**auxDialog).handleCancelButton = true;

return noErr;
}

/*
##############################################################

__HideDialogItem
```

Attorney Docket No.: APPL1328MCF/WSW/BBM
bbm/appl/1328.001

```
FUNCTION:   Hide the given dialog item in the given dialog
INPUTS:     theDialog: the dialog we're working with
            itemNum: index of the item we want to hide
OUTPUTS:    none
RETURNS:    void
*/
pascal void __HideDialogItem (DialogRef theDialog, DialogItemIndex1 itemNum)
{
        GrafPtr oldPort;
        DialogPeek realDialog = (DialogPeek) theDialog;
        DITLItemPtr theItem;
        DialogItemIndex0 newEditField;

/* set the port and set up our item list */
        BeginInWind (realDialog, &oldPort);

(void) GetDialogItemCommon (realDialog, itemNum, &theItem);
        require (theItem != NULL, CouldNotFindItem);

itemNum--;

/* if the item isn't already hidden, hide it */
        if (IsVisibleItem (realDialog, itemNum)) {
                Rect                    oldRect;
                AuxDialogItemPtr        auxItem;

/* get the item's aux record -- it holds the visible attribute -- and
                 * set the attribute to false */
                auxItem = GetAuxDialogItem (realDialog, itemNum);
                auxItem->isVisible = false;

/* if the item is the active edit text field, deactivate
                 * it before we move its rect */
                if (realDialog->editField == itemNum)
                        DeactivateEditField (realDialog);

/* save the old item's rect and erase that area */
                GetCompleteItemRect (theItem, &oldRect);
                EraseRect (&oldRect);        // NNN does this have to change for MASH?

/* if we just hid the active edit text item, find a new
                 * one and activate it */
                if (realDialog->editField == kNoEditField) {
                        newEditField = GetDialogKeyboardFocusItem (realDialog, NULL);
                        if (newEditField != kNoEditField) {
```

```
                            DITLItemPtr    newTextItem;

(void) GetDialogItemCommon (realDialog,
newEditField + 1,
&newTextItem);
                            SetDialogItemKeyboardFocus (realDialog,
newEditField, newTextItem,
                                    0, 0);
                            }
                    }

/* if this item is a control, hide it */
                    if (IsControlItem (theItem))
                            HideControl ((ControlRef) theItem->itemHandle);
            }

CouldNotFindItem:
        EndInWind (realDialog, oldPort);
}

/*
##################################################################

_ShowDialogItem

FUNCTION:   Show the given dialog item in the given dialog
INPUTS:     theDialog: the dialog we're working with
                    itemNum: index of the item we want to show (0-based)
OUTPUTS:    none
RETURNS:    void
*/
pascal void __ShowDialogItem (DialogRef theDialog, DialogItemIndex1
itemNum)
{
        DialogPeek                      realDialog = (DialogPeek) theDialog;
        GrafPtr                         savedPort;
        DITLItemPtr             theItem;

/* save our port */
        BeginInWind (realDialog, &savedPort);

/* get the item we're going to show. bail if twe can't find it */
        (void) GetDialogItemCommon (realDialog, itemNum, &theItem);
        require (theItem != NULL, CouldNotFindItem);

/* use a 0-based item offset */
        itemNum--;

/* if the item is invisible, show it */
        if (! IsVisibleItem (realDialog, itemNum)) {
                Rect                            redrawRect;
```

```
            AuxDialogItemPtr        auxItem;

auxItem = GetAuxDialogItem (realDialog, itemNum);
            auxItem->isVisible = true;

/* if the dialog does not have a keyboard-focused item, and this
             * item can take keyboard focus, set focus onto this item */
            if ((realDialog->editField == kNoEditField) &&
                    (IsKeyboardSelectableItem (realDialog, itemNum, theItem)))
                            SetDialogItemKeyboardFocus (realDialog, itemNum,
theItem, 0, 0);

/* if this is a control, show it */
            if (IsControlItem (theItem))
                    ShowControl ((ControlRef) theItem->itemHandle);

/* invalidate the item's rect so it will be redrawn */
            GetCompleteItemRect (theItem, &redrawRect);
            InvalRect (&redrawRect);
        }

CouldNotFindItem:
        EndInWind (realDialog, savedPort);
}

/*
##########################################################

__DrawDialog

FUNCTION:   Draws each item in the dialog
INPUTS:     theDialog: the dialog we want to draw
OUTPUTS:    none
RETURNS:    void
*/
pascal void __DrawDialog (DialogRef theDialog)
{
        DialogPeek realDialog = (DialogPeek) theDialog;
        GrafPtr savedPort;

// set the port
        BeginInWind (realDialog, &savedPort);

// draw all controls
        DrawControls (theDialog);

// draw all the items
        DoForEachItem (realDialog, kDraw, NULL);

// restore port
```

EndInWind (realDialog, savedPort);
}

/*
##########################################################

__UpdateDialog

FUNCTION: Draws each item in the dialog that lies within the given update region
INPUTS: theDialog: the dialog we want to draw
updateRegion: the region in which items should be redrawn
OUTPUTS: none
RETURNS: void
*/
pascal void __UpdateDialog (DialogRef theDialog, RgnHandle updateRegion)
{

WindowRef dialogWindow = GetDialogWindow (theDialog);
    DialogPeek realDialog = (DialogPeek) theDialog;
    GrafPtr savedPort;

// set the port
    BeginInWind (realDialog, &savedPort);

// draw all controls
    DrawControls (dialogWindow);

// draw all the items
    DoForEachItem (realDialog, kUpdate, updateRegion);

// restore port
    EndInWind (realDialog, savedPort);
}

/*
##########################################################

__FindDialogItem

FUNCTION: returns the first dialog item whose rect encloses the given point
INPUTS: theDialog: the dialog in which we are searching
thePoint: the point that is enclosed by the item we return (nice english!)
OUTPUTS: none
RETURNS: index of the first item whose rect encloses the given point (0-based),
or kNoItemHit (-1) if no item surrounds this point
*/

```
pascal DialogItemIndex0 _FindDialogItem (DialogRef theDialog, Point
thePoint)
{
        DITLItemPtr currentItem;
        DialogPeek realDialog = (DialogPeek) theDialog;
        DialogItemIndex1 numItems = CountDITL (theDialog);
        DialogItemIndex0 itemIndex;

SetupItemList (realDialog);
        currentItem = FirstDialogItem (realDialog);

for (itemIndex = 0; itemIndex < numItems; itemIndex++) {
                if ((PtInRect (thePoint, ¤tItem->itemRect)) &&
                        (IsVisibleItem (realDialog, itemIndex))) {
                        DoneWithItemList (realDialog);
                        return itemIndex;
                } currentItem = NextDialogItem (currentItem);
        }

DoneWithItemList (realDialog);
        return kNoItemHit;
}

/*
##################################################################

GetDialogItemCommon

FUNCTION:   Common code for getting a dialog item. Call this from inside
            the dialog manager to get an individula DITL item.

INPUTS:     theDialog: the dialog we're working with
            itemIndex: the index of the item we want (1-based)
OUTPUTS:    theItem: the item we want (or NULL if no such item exists)
RETURNS:    true if the index points to a real item

*/
Boolean GetDialogItemCommon (DialogPeek theDialog, DialogItemIndex1
itemIndex, DITLItemPtr *theItem)
{
        DialogItemIndex1 i;
        DITLItemPtr             currentItem;

require (itemIndex <= CountDITL ((DialogRef) theDialog), BadIndex);

/* get the first item */
        currentItem = FirstDialogItem (theDialog);

/* skip ahead to each item in the DITL */
```

```
        for (i = 1; i < itemIndex; i++)
            currentItem = NextDialogItem (currentItem);

/* all done - set the index appropriately and return true, indicating
success */
        *theItem = currentItem;
        return true;

BadIndex:
        *theItem = NULL;
        return false;
}

/*
##################################################################

GetCompleteItemRect

FUNCTION:   Given an item, return the rect of its entire drawing area.
            (for edit text and default buttons, this area is outside
            the bounds of its rect)
INPUTS:     theItem: the item whose rect we want
OUTPUTS:    theRect: the entire drawing area rect for this item
RETURNS:    void
*/
void GetCompleteItemRect (DITLItemPtr theItem, Rect *theRect)
{
        SInt16 inset;

if (IsEditTextItem (theItem))
            inset = -3;

else if (IsButtonControlItem (theItem))
            inset = -kDefaultItemSlop;
        else
            inset = 0;

/* get the item's rect and inset it */
        *theRect = theItem->itemRect;
        InsetRect (theRect, inset, inset);
}

/*
##################################################################

NextDialogItem

FUNCTION:   skips to the next dialog item ahead of the one passed to us.
Assumes we are passed a valid DITL item.
```

```
INPUTS:     currentItem: the current item in a DITL list
OUTPUTS:    none
RETURNS:    next item after currentItem in the DITL
                NOTE: will not check to see if we have gone beyond the end of
the
DITL!

*/
DITLItemPtr NextDialogItem (DITLItemPtr currentItem)
{
        UInt16  offset;

/* calculate the offset from currentItem - take the base size and add
the
         * length of the string at the end */
        offset = DITLItemSizeWithNoData + StrLength (currentItem->itemData);

/* make the offset even */
        if ((offset & 1) != 0)
                offset++;

return (DITLItemPtr) BYTE_OFFSET (currentItem, offset);
}

/*
##################################################################

FirstDialogItem

FUNCTION:   determines the first item in the dialog's item list.
INPUTS:     theDialog: the dialog we're working with
OUTPUTS:    none
RETURNS:    first item of the DITL of this dialog
*/
DITLItemPtr FirstDialogItem (DialogPeek theDialog)
{
        DITLHeader          *theDITL;

/* get the dialog's items */
        theDITL = (DITLHeader *) *theDialog->items;

check (theDITL != NULL);

/* return the first member of the item list */
        return theDITL->items;
}

/*
##################################################################
```

Attorney Docket No.: APPL1328MCF/WSW/BBM
bbm/appl/1328.001

InitDialogItem

FUNCTION: Initializes the given dialog item as appropriate.
INPUTS: theDialog: the dialog we're working with
theItem: the DITL item within theDialog
itemIndex: 0-based index of that item.
OUTPUTS: none
RETURNS: void
*/
```
void InitDialogItem (DialogPeek theDialog, DITLItemPtr theItem,
DialogItemIndex0 itemIndex)
{
        require (theItem->itemHandle == NULL, DoNotInitialize);

if (IsControlItem (theItem))
                InitControlItem (theDialog, theItem, itemIndex);

/* text item - just create a handle to the text for the item from
         * its data and place it into the item's data handle */
        else if ((IsStaticTextItem (theItem)) || (IsEditTextItem (theItem))) {
                Handle   textHandle;
                Ptr      textPtr;
                SInt32   handleLength;
                OSErr    theError;

textPtr = (Ptr) &(theItem->itemData[1]);
                handleLength = StrLength (theItem->itemData);

theError = PtrToHand (textPtr, &textHandle, handleLength);

/* check for memory error */
                check (theError == noErr);

theItem->itemHandle = textHandle;
        }

/* icon item - try for a color icon first, then a b/w one.  Place
         * the icon into the item's handle */
        else if (IsIconItem (theItem)) {
                Handle            iconHandle;
                IconDITLItemPtr   iconDITLItem;

/* this is a fixed-length item with the resource id
                 * at the last word. */
                iconDITLItem = (IconDITLItemPtr) theItem;
                iconHandle = (Handle) GetCIcon (iconDITLItem->resourceID);

/* no color icon? try for a black and white one */
                if (iconHandle == NULL)
                        iconHandle = GetIcon (iconDITLItem->resourceID);
```

```
                iconDITLItem->itemHandle = iconHandle;
        }

/* picture item - try to get the corresponding picture
         * resource, and put it into the item's handle */
        else if (IsPictureItem (theItem)) {
                PicHandle                    pictureHandle;
                PictureDITLItemPtr    pictureDITLItem;

/* this is a fixed-length item with the resource id
                 * at the last word. */
                pictureDITLItem = (PictureDITLItemPtr) theItem;
                pictureHandle = GetPicture (pictureDITLItem->resourceID);

pictureDITLItem->itemHandle = (Handle) pictureHandle;
        }

/* new IDO item - Get the IDO and initialize it */
        else if (IsIDOItem (theItem)) {
                OSErr theError;

theError = InitIDOItem (theDialog, theItem, itemIndex);

if (theError == noErr)
                        AddToIdleTimeItemList (theDialog, itemIndex);
        }

/* otherwise, the item is a user field and doesn't need a special
         * initialization */

DoNotInitialize:
        return;
}

/*
##################################################################

DisposeDialogItem

FUNCTION:   Disposes the given dialog item
INPUTS:     theItem: the item we're disposing
OUTPUTS:    none
RETURNS:    void
*/
static void DisposeDialogItem (DialogPeek theDialog, DITLItemPtr theItem,
                DialogItemIndex0 itemIndex)
{
```

```
/* special case for controls. The window manager may have
 * disposed this already (in the case of a DisposeWindow,
 * wherein it disposes all controls in its list. If this
 * is the case, then the window's controlList will
 * be null, and don't bother doubly disposing the control */
if (IsControlItem (theItem)) {
        WindowRef dialogWindow;

dialogWindow = GetDialogWindow ((DialogRef) theDialog);
        if (GetWindowControlList (dialogWindow) != NULL)
                DisposeControl ((ControlRef) theItem->itemHandle);
} else if (IsStaticTextItem (theItem) || IsEditTextItem (theItem))
        DisposeHandle (theItem->itemHandle);

else if (IsIconItem (theItem)) {
        Size iconSize;

iconSize = GetHandleSize (theItem->itemHandle);
        if (iconSize > kBWIconSize)
                DisposeCIcon ((CIconHandle) theItem->itemHandle);
} else if (IsIDOItem (theItem)) {
        DisposeIDOItem (theItem);
        RemoveFromIdleTimeItemList (theDialog, itemIndex);
}

/* regardless, NULL out the item's handle */
theItem->itemHandle = NULL;
}

/*
#############################################################

InitControlItem

FUNCTION:   Initializes the given control item
INPUTS:     theDialog: the dialog we're working with
                    theItem: the DITL item within theDialog
                    itemIndex: 0-based index of that item.
OUTPUTS:    none
RETURNS:    void
*/
void InitControlItem (DialogPeek theDialog, DITLItemPtr theItem,
DialogItemIndex0 itemIndex)
{
        ControlRef                      theControl;
```

```
           ControlDITLItemPtr      controlDITLItem;
           CCTabHandle             controlColorTable;
           WindowRef               dialogWindow;

dialogWindow = GetDialogWindow ((DialogRef) theDialog);

/* if this is a resources based control, get the control
            * resource */
           if (IsResourceControlItem (theItem)) {
                   /* this DITL item is fixed length with the resource id
                    * at the end. */
                   controlDITLItem = (ControlDITLItemPtr) theItem;

/* get the new control and position it */
                   theControl = GetNewControl (controlDITLItem->resourceID,
dialogWindow);
                   MoveControl (theControl, theItem->itemRect.left,
theItem->itemRect.top);
           }

/* otherwise, create a new control. The CDEF's index is indicated in
            * the lower 2 bits of the type field */
           else {
                   SInt16  itemControlType;
                   itemControlType = GetItemType (theItem) & 3;

theControl = NewControl (dialogWindow, &(theItem->itemRect),
                           (ConstStr255Param) theItem->itemData, true, 0, 0, 1,
itemControlType,
0);
           }

/* if this is a color control, set its accordingly */ controlColorTable = (CCTabHandle) NewHandle (0);
           if (MemError () != noErr) {
                   if (GetControlItemColorTable (theDialog, itemIndex,
&controlColorTable))
                           SetControlColor (theControl, controlColorTable);

DisposeHandle ((Handle) controlColorTable);
           }

/* all done coloring. Validate the control's rectangle to avoid
redraw,
            * and place it into the item's handle for future use. */
           ValidRect (&(theItem->itemRect));
           theItem->itemHandle = (Handle) theControl;
}

/*
```

```
#####################################################################
```

GetItemListCopy

FUNCTION:   Gets a copy of the item list for the given 'DITL'
INPUTS:     resourceID: resource ID for the dialog's 'DITL'.
OUTPUTS:    theDITL: copy of the DITL resource.
RETURNS:    the appropriate error value (MemError or ResError) if we
            don't succeed; noErr if everything is cool.
*/
OSErr GetItemListCopy (ResourceID resourceID, Handle *theDITL,
ICTBHeaderHandle *theICTB)
{
        OSErr theError;
        Handle ditlResource;
        Handle ictbResource;

if HandlesICTBs
        /*
         * get the ictb and copy it
         */
        MyTempInsertROMMap (true);
        ictbResource = GetResource ('ictb', resourceID);

if (ictbResource != NULL) {
                theError = HandToHand (&ictbResource);

if (theError != noErr)
                        return theError;
        }

/* fill in our copied ictb */
        if (theICTB != NULL)
                *theICTB = (ICTBHeaderHandle) ictbResource;
else
        *theICTB = NULL;
endif /*
         * get the DITL and copy it
         */
        MyTempInsertROMMap (true);
        ditlResource = GetResource ('DITL', resourceID);

if (ditlResource != NULL) {
                theError = HandToHand (&ditlResource);

```
                if (theError != noErr)
                        return theError;
        }

/* fill in our copied DITL */
        if (theDITL != NULL)
                *theDITL = ditlResource;

/* if we had a resource error, indicate this in the return value */
        return ResError ();
}

/*
#############################################################

SetupItemList

FUNCTION:   reloads the DITL resource if it was purged. locks it.
                     also locks the AuxDialog handle.
INPUTS:     theDialog: the dialog we're working with
OUTPUTS:    none
RETURNS:    void
*/
void SetupItemList (DialogPeek theDialog)
{
        Handle items;
        AuxDialogHandle auxDialog;

items = theDialog->items;

/* sanity check */
        check (items != NULL);

/* purged? get it again. */
        if (*items == NULL) {
                LoadResource (items);

/* we should check for ResError,
                check (ResError() == noErr);
        }

/* lock this down */
        HLock (items);

/* get and lock the dialog's AuxItems */
        auxDialog = GetAuxDialog (theDialog);
        if (auxDialog != NULL)
                HLock ((**auxDialog).auxItems);
}

/*
```

```
###############################################################
```

DoneWithItemList

FUNCTION: Call this when done working with the DITL; it unlocks
    the DITL handle and the aux dialog item handle
INPUTS: theDialog: the dialog we're working with
OUTPUTS: none
RETURNS: void
*/
void DoneWithItemList (DialogPeek theDialog)
{
    AuxDialogHandle auxDialog;

HUnlock ((Handle) theDialog->items);

auxDialog = GetAuxDialog (theDialog);
    if (auxDialog != NULL)
        HUnlock ((**auxDialog).auxItems);
}

/*
#########################################################
```

FrameDialogItem

FUNCTION: Place a framed round rectangle around the given dialog item rect
INPUTS: theRect: the rectangle around which we set the frame
    frameThickness: thickness of the frame in pixels
    frameCorner: oval width and height for the RoundRect
    frameOutset: outset from theRect that we set the frame for.
OUTPUTS: none
RETURNS: void
*/
void FrameDialogItem (Rect *theRect, SInt16 frameThickness, SInt16
frameCorner,
    SInt16 frameOutset)
{
    /* frame the given rect at the given outset, thickness and corner */
    PenSize (frameThickness, frameThickness);
    InsetRect (theRect, -frameOutset, -frameOutset);
    FrameRoundRect (theRect, frameCorner, frameCorner);

/* restore theRect */
    InsetRect (theRect, frameOutset, frameOutset);
}

/*
#########################################################
```

Attorney Docket No.: APPL1328MCF/WSW/BBM

DoForEachItem

FUNCTION: cycle through each item in the list and apply the given
function
                    to each item.
INPUTS:    theDialog: the dialog we are working with
                    function: indicates what to do with each item
                    updateRegion: if NULL, apply to all items. If not null, apply
                        only to items in this region.
OUTPUTS:   none
RETURNS:   void
*/
void DoForEachItem (DialogPeek theDialog, ScanDialogFunction function,
RgnHandle updateRegion)
{
        DITLItemPtr              currentItem;
        DialogItemIndex1         itemIndex, numItems;

/* get the number of items in the ditl */
        numItems = CountDITL ((DialogRef) theDialog);

/* loop through all the items in the list */
        currentItem = FirstDialogItem (theDialog);
        for (itemIndex = 0; itemIndex < numItems; itemIndex++) {

/* apply the given function to the current item */
                switch (function) { case kInitialize:
                                InitDialogItem (theDialog, currentItem, itemIndex);
                                break;

case kDraw:
                                DrawDialogItem (theDialog, currentItem, itemIndex);
                                break;

case kDispose:
                                DisposeDialogItem (theDialog, currentItem, itemIndex);
                                break;

case kUpdate:
                                UpdateDialogItem (theDialog, currentItem, itemIndex,
updateRegion);
                                break;

default:
                                /* should never get here */
                                check (true);
                }
                /* move on to the next item in the list */
                currentItem = NextDialogItem (currentItem);

```
        }
}

/*
##################################################################

DrawDialogItem

FUNCTION:   draw the given dialog item in the given dialog
INPUTS:     theDialog: the dialog we are working with
                theItem: the item to be drawn
                itemIndex: the index of the item in the dialog's DITL (0-based)
OUTPUTS:    none
RETURNS:    void
*/
void DrawDialogItem (DialogPeek theDialog, DITLItemPtr theItem,
DialogItemIndex0 itemIndex)
{
        UserItemUPP         userItemProc;
        DialogSaveState     saveState;
        Boolean             doSaveAndRestore;

/* if the item is invisible, don't draw anything */
        if (! IsVisibleItem (theDialog, itemIndex))
                return;

/* if this item is a user field, draw it */
        if (IsUserItem (theItem)) {
                /* get the user item's drawing proc - it's in its itemHandle */
                userItemProc = (UserItemUPP) (theItem->itemHandle);

/* is there one? If so, save our state and call the proc to
                 * draw it */
                if (userItemProc != NULL) {

/* if we're a color dialog, we have to save and restore
                         * the dialog's state */
                        doSaveAndRestore = DialogHasColorItems (theDialog);

if (doSaveAndRestore) {
                                /* set our port, since the item will be drawn in the
dialog */
                                SetPort ((GrafPtr) theDialog);

/* preserve our dialog state - anything could happen  
*/

SaveDialogState (theDialog, kDontRestoreTextEditInfo,
&saveState);
                        }
```

```
                SetEmulatorRegister (kRegisterD1, 1);

/* call through to the user item procedure */
                (void) CallUserItemProc (userItemProc, (DialogRef) theDialog,
itemIndex
+ 1);

/* if we're a color dialog, restore the state */
                if (doSaveAndRestore) {
                        /* just in case the user item did something nasty... */
                        SetPort ((GrafPtr) theDialog);

/* restore everything */
                        RestoreDialogState (theDialog,
kDontRestoreTextEditInfo, &saveState);
                }
            }
        }

/* control item? only draw a hilight around it if it's
         * the keyboard foucs item */
        else if (IsControlItem (theItem)) {
#if ControlItemsAreKeyboardSelectable
                if (itemIndex == theDialog->editField)
                        FrameDialogItem (&theItem->itemRect, 1, 1, 1);
#endif
        }

/* text item? call through to DrawTextDialogItem */
        else if (IsStaticTextItem (theItem))
                DrawTextDialogItem (theDialog, theItem, itemIndex, true);

else if (IsEditTextItem (theItem))
                DrawTextDialogItem (theDialog, theItem, itemIndex, false);

/* picture item? draw it */
        else if (IsPictureItem (theItem)) {
                PicHandle thePicture;
                thePicture = (PicHandle) theItem->itemHandle;

if (*thePicture == NULL)
                        LoadResource ((Handle) thePicture);

DrawPicture (thePicture, &theItem->itemRect);
        } else if (IsIconItem (theItem)) {
```

```
        Size iconSize;

iconSize = GetHandleSize (theItem->itemHandle);

if (iconSize <= 0)
                ;

/* assume we have a b/w icon if the icon's size is
         * the standard b/w icon size. Otherwise, draw a
         * color icon. */
        else if (iconSize == kBWIconSize)
                PlotIcon (&theItem->itemRect, theItem->itemHandle);
        else
                PlotCIcon (&theItem->itemRect, (CIconHandle)
theItem->itemHandle);
        }

/* IDO - send it a draw message */
        else if (IsIDOItem (theItem))
                DrawIDOItem (theDialog, theItem);
}

/*
##################################################################

UpdateDialogItem

FUNCTION:   if the given dialog item is inside the given region, draw it
INPUTS:     theDialog: the dialog we are working with
                    theItem: the item to be drawn
                    itemIndex: the index of the item in the dialog's DITL (0-based)
                    updateRegion: the region in which items should be redrawn
OUTPUTS:    none
RETURNS:    void
*/
static void UpdateDialogItem (DialogPeek theDialog, DITLItemPtr
theItem, DialogItemIndex0 itemIndex,
                RgnHandle updateRegion)
{
        Rect itemRect;

/* get the item's rect, but give it a 4 pixel buffer (for the frame
         * around the default button) */
        itemRect = theItem->itemRect;
        InsetRect (&itemRect, -kDefaultBorderOutset, -kDefaultBorderOutset);

/* if this rect lies within the update region, draw this item */
        if (RectInRgn (&itemRect, updateRegion))
                DrawDialogItem (theDialog, theItem, itemIndex);
}
```

```
/*
##############################################################

SetDialogItemKeyboardFocus

FUNCTION:   Sets keyboard focus on the given dialog item
INPUTS:     theDialog: the dialog we're working with
                    itemIndex: index of item we're setting focus on
                    theItem: the item we're focusing on
                    selStart, selEnd: if we are setting focus on an edit
                            text item, the selection range for that item
OUTPUTS:    none
RETURNS:    void
*/
void SetDialogItemKeyboardFocus (DialogPeek theDialog, DialogItemIndex0
itemIndex,
        DITLItemPtr theItem, TextSelectionPoint selStart, TextSelectionPoint
selEnd)
{
        check (IsKeyboardSelectableItem (theDialog, itemIndex, theItem));

if (IsEditTextItem (theItem))
                ActivateNewEditField (theDialog, itemIndex, selStart, selEnd);

else if (IsIDOItem (theItem))
                SetIDOItemKeyboardFocus (theItem, true);

#if ControlItemsAreKeyboardSelectable
        else if (IsControlItem (theItem)) {
                // tell the control it has focus
        }
endif else
                check (true);                                    // we don't know how to
select other items
}

/*
##############################################################

UnsetDialogItemKeyboardFocus

FUNCTION:   Unsets keyboard focus on the given dialog item
INPUTS:     theDialog: the dialog we're working with
OUTPUTS:    none
RETURNS:    void
*/
void UnsetDialogItemKeyboardFocus (DialogPeek theDialog)
{
        DialogItemIndex0 itemIndex;
```

```
        DITLItemPtr theItem;

itemIndex = theDialog->editField;

/* try to get the item that has keyboard focus. If there
         * is an item, unset the focus */
        if (GetDialogItemCommon (theDialog, itemIndex + 1, &theItem)) {
                if (IsEditTextItem (theItem))
                        DeactivateEditField (theDialog);

else if (IsIDOItem (theItem))
                        SetIDOItemKeyboardFocus (theItem, false);

#if ControlItemsAreKeyboardSelectable
                else if (IsControlItem (theItem)) {
                        // tell the control it lost its focus
                }
endif

}
}

/*
#############################################################

GetDialogKeyboardFocusItem

FUNCTION:   return the current keyboard focus item in the dialog. If none is focused,
search for the first item in the DITL that can take keyboard focus
INPUTS:     theDialog: the dialog we are working with
OUTPUTS:    editItem: the edit field's DITL item (NULL if none found)
                        If passed in as NULL, don't fill it in
RETURNS:    the index of the item in the list (kNoEditField if none found)
- 0 based
*/
DialogItemIndex0 GetDialogKeyboardFocusItem (DialogPeek theDialog,
DITLItemPtr *editItem)
{
        /* if we already have an focused item, return that item */
        if (theDialog->editField != kNoEditField) {
                DITLItemPtr dummyItem;

/* if there is an item that corresponds to editField's
                 * index, return that item and its index */
                if (GetDialogItemCommon (theDialog, theDialog->editField + 1,
&dummyItem)) {
                        if (editItem != NULL)
                                *editItem = dummyItem;
                        return theDialog->editField;
                }
```

```
        }

/* otherwise, scan the list of items, and return the first
         * visible keyboard focus item we find */
        else {
                DITLItemPtr                     currentItem;
                DialogItemIndex0        itemIndex, numItems;

/* get the number of items in the ditl */
                numItems = CountDITL ((DialogRef) theDialog);

/* loop through all of the items in this dialog */
                currentItem = FirstDialogItem (theDialog);
                for (itemIndex = 0; itemIndex < numItems; itemIndex++) {

/* if the current item's type is edit text and it's visible, we're
                         * done - return this item */
                        if ((IsKeyboardSelectableItem (theDialog, itemIndex,
currentItem))
                                        && (IsVisibleItem (theDialog,
itemIndex))) {
                                if (editItem != NULL)
                                        *editItem = currentItem;
                                return itemIndex;
                        }

/* move on to the next item */
                        currentItem = NextDialogItem (currentItem);
                }
        }

/* we get here if we didn't find an edit field.  Indicate thus in the
return value */
        if (editItem != NULL)
                *editItem = NULL;
        return kNoEditField;
}
```

What is claimed is:

1. A computer implemented method for managing items in a dialog box, comprising the steps of:
   executing an instruction calling for said dialog box;
   reading, by a dialog manager, a dialog resource associated with said dialog box;
   reading, by the dialog manager, a dialog item list resource referenced by said dialog resource to access a list of said items in said dialog box, said list of said items being in said dialog item list resource, and including a first reference to an object oriented class, a location for each item in said list of said items, and a class name for at least a subset of items in said list of said items;
   following, by the dialog manager, said first reference to said object oriented class, said object oriented class representing a definition of a first item in said list of said items;
   managing said first item, based on an instance of said object oriented class, by responding to events defined by said definition of the first item and executing at least one method from said instance of said object oriented class, using said dialog manager, said at least one method corresponding to said events, wherein said object oriented class is part of an object oriented class structure that includes a base class and at least one subclass, the object oriented structure allowing for the subclass to inherit methods defined in the base class.

2. The method according to claim 1, further including the steps of:
   waiting for a draw event; and
   executing a draw method, without executing other methods in said object oriented class, in response to said draw event.

3. The method according to claim 1, further including the steps of:
   waiting for an edit event; and
   executing an edit method, without executing other methods in said object oriented class, in response to said edit event.

4. The method according to claim 1, further including the steps of:
   waiting for a first event associated with said first item;
   entering said instance of said object oriented class at a first entry point in response to said first event; and
   executing a first method in said object oriented class in response to said first event, said first entry point associated with said first method.

5. The method according to claim 1, further including the steps of:
   passing control from said dialog manager to an application after said dialog box has been created;
   passing control from said application to said dialog manager when there is an event; and
   said dialog manager accessing a method from said instance of said object oriented class, said method being relevant to said event.

6. The method according to claim 1, wherein said dialog resource and said dialog item list resource are in a single resource.

7. The method according to claim 1, wherein said dialog resource includes information about said dialog box and a reference to said dialog item list resource.

8. The method according to claim 1, further including the steps of:
   using said dialog manager to follow a second reference to a definition of a second item, said definition not being part of an object oriented class structure; and
   managing said second item using said dialog manager, based on said definition of said second item.

9. An apparatus which uses a dialog box, comprising:
   a processor;
   a memory in communication with said processor;
   a storage device in communication with said processor, said storage device storing program code for programming said processor to perform steps for managing items in said dialog box, including:
   executing an instruction calling for said dialog box,
   reading, by a dialog manager, a dialog resource associated with said dialog box;
   reading, by the dialog manager, a dialog item list resource referenced by said dialog resource to access a list of said items in said dialog box, said list of said items being in said dialog item list resource, and including a first reference to an object oriented class, a location for each item in said list of said items, and a class name for at least a subset of items in said list of said items,
   following, by the dialog manager, said first reference to said object oriented class, said object oriented class representing a definition of a first item in said list of said items,
   managing said first item, based on an instance of said object oriented class, by responding to events defined by said definition of the first item and executing at least one method from said instance of said object oriented class, using said dialog manager, said at least one method corresponding to said events, wherein said object oriented class is part of an object oriented class structure that includes a base class and at least one subclass, the object oriented structure allowing for the subclass to inherit methods defined in the base class.

10. The apparatus according to claim 9, wherein said storage device stores program code for programming said processor to perform steps for managing said items in said dialog box further including the steps of:
    passing control from said dialog manager to an application after said dialog box has been created,
    passing control from said application to said dialog manager when there is an event, and
    said dialog manager accessing a method from said instance of said object oriented class, said method being relevant to said event.

11. The apparatus according to claim 9, wherein said step of using said dialog manager to read a resource associated with said dialog box includes the steps of:
    reading a dialog resource associated with said dialog box; and
    reading a dialog item list resource referenced by said dialog resource.

12. The apparatus according to claim 9, wherein said storage device storing program code for programming said processor to perform steps for managing said items in said dialog box further includes the steps of:
    waiting for a first event associated with said first item;
    entering said instance of said object oriented class at a first entry point in response to said first event; and
    executing a first method in said object oriented class in response to said first event, said first entry point associated with said first method.

13. A computer implemented operating method of a dialog manager executing on a computing system for providing an item in a dialog box using:

at least one interface definition object that is an instance of a class definition that defines a behavior of the item;

at least one dialog item list resource, each dialog item list resource defining a list of items in the dialog box and referring to the at least one interface definition object; and at least one dialog resource associated with the dialog box, wherein the dialog manager is configured to manage the dialog box, the operating method comprising:

reading the at least one dialog resource by the dialog manager;

accessing, by the dialog manager, the at least one dialog item list resource that defines the list of items in the dialog box associated with the at least one dialog resource;

creating, by the dialog manager, the at least one interface definition object referred to by the at least one dialog item list resource; and reacting to events as defined by the at least one interface definition object corresponding to the item by executing at least one method in said interface definition object, using said dialog manager, the at least one method corresponding to the events, wherein the class definition of said interface definition object is part of an object oriented class structure that includes a base class and at least one subclass, the object oriented structure allowing for the subclass to inherit methods defined in the base class.

14. The computer implemented operating method of claim 13, wherein each dialog resource includes a plurality of dialog box attribute fields and refers to a respective dialog item list resource.

15. The computer implemented operating method of claim 14, wherein the dialog box attribute fields include at least one of the size of the dialog box, position of the dialog box, whether the dialog box can be moved, and conditions for closing the dialog box.

16. A computer readable recording medium having recorded thereon a computer program of a dialog manager for providing an item in a dialog box using:

at least one interface definition object that is an instance of a class definition that defines a behavior of the item;

at least one dialog item list resource, each dialog item list resource defining a list of items in the dialog box and referring to the at least one interface definition object; and at least one dialog resource associated with the dialog box, wherein the dialog manager is configured to manage the dialog box, wherein, when the computer program is executed by a computer system, the computer program causes the computer system to perform the following operations:

reading the at least one dialog resource by the dialog manager;

accessing, by the dialog manager, the at least one dialog item list resource that defines the list of items in the dialog box associated with the at least one dialog resource;

creating, by the dialog manager, the at least one interface definition object referred to by the at least one dialog item list resource; and reacting to events as defined by the at least one interface definition object corresponding to the item by executing at least one method in said interface definition object, using said dialog manager, the at least one method corresponding to the events, wherein the class definition of said interface definition object is part of an object oriented class structure that includes a base class and at least one subclass, the object oriented structure allowing for the subclass to inherit methods defined in the base class.

* * * * *

UNITED STATES PATENT AND TRADEMARK OFFICE
CERTIFICATE OF CORRECTION

| | | |
|---|---|---|
| PATENT NO. | : 7,712,109 B2 | |
| APPLICATION NO. | : 10/445365 | |
| DATED | : May 4, 2010 | |
| INVENTOR(S) | : Lewis K. Cirne | |

It is certified that error appears in the above-identified patent and that said Letters Patent is hereby corrected as shown below:

In column 6, line 9, delete "working, memory" and insert -- working memory --, therefor.

In column 7, line 9, delete "of. routines" and insert -- of routines --, therefor.

In column 7, line 19, delete "Addison-Wesley." and insert -- Addison-Wesley --, therefor.

In column 7, line 32, delete "provides 'simple" and insert -- provides simple --, therefor.

In column 8, line 22, delete "computer:" and insert -- computer. --, therefor.

In column 8, line 67, delete "are," and insert -- are --, therefor.

In column 11, line 27, delete "Nan" and insert -- an --, therefor.

In column 12, line 14, delete "Class.302" and insert -- Class 302 --, therefor.

In column 15, line 58, delete "(void)"," and insert -- (void)" --, therefor.

In column 24, line 65, delete "290" and insert -- 200 --, therefor.

In column 27, line 8, delete "Thee" and insert -- The --, therefor.

In column 43-44, line 20, delete "managerment" and insert -- management --, therefor.

In column 59-60, line 34, delete "twe" and insert -- we --, therefor.

In column 65-66, line 25, delete "individula" and insert -- individual --, therefor.

In column 89-90, line 16, delete "hilight" and insert -- highlight --, therefor.

In column 89-90, line 17, delete "foucs" and insert -- focus --, therefor.

Signed and Sealed this
Twenty-fifth Day of October, 2011

David J. Kappos
*Director of the United States Patent and Trademark Office*